United States Patent
Staerk et al.

(10) Patent No.: US 11,349,960 B2
(45) Date of Patent: *May 31, 2022

(54) INTEGRATION OF CLIENT SYSTEM GROUPS

(71) Applicant: Microsoft Technology Licensing, LLC, Redmond, WA (US)

(72) Inventors: Alfons A. Staerk, Carnation, WA (US); Shashi R. Singaravel, Sammamish, WA (US); Sarat Chandra Subramaniam, Redmond, WA (US); Ladislau Conceicao, Redmond, WA (US); James C. Kleewein, Kirkland, WA (US); Amit Gupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,468

(22) Filed: Apr. 3, 2019

(65) Prior Publication Data

US 2019/0230195 A1    Jul. 25, 2019

Related U.S. Application Data

(63) Continuation of application No. 14/229,057, filed on Mar. 28, 2014, now Pat. No. 10,291,745.

(51) Int. Cl.
*H04L 67/01*    (2022.01)
*H04L 47/80*    (2022.01)
(Continued)

(52) U.S. Cl.
CPC .............. *H04L 67/42* (2013.01); *G06Q 10/10* (2013.01); *H04L 47/80* (2013.01)

(58) Field of Classification Search
CPC ..... G06F 3/0482; G06F 16/287; H04L 63/065; H04L 63/104; H04L 47/80; H04L 51/22;
(Continued)

(56) References Cited

U.S. PATENT DOCUMENTS 10,931,656 B2 *    2/2021    Carru ...................... H04L 63/08
11,223,613 B2 *    1/2022    Das ...................... H04L 12/6418
(Continued)

FOREIGN PATENT DOCUMENTS

CN    103034716 A    4/2013
CN    103649985 A    3/2014
(Continued)

OTHER PUBLICATIONS

"Office Action Issued in Chinese Patent Application No. 201580017046.7", dated Mar. 5, 2019, 12 Pages.
(Continued)

*Primary Examiner* — Kevin T Bates
*Assistant Examiner* — Ranjan Pant
(74) *Attorney, Agent, or Firm* — Christopher J. Volkmann; Kelly, Holt & Christenson, PLLC

(57) ABSTRACT

A method performed by a computing system comprises accessing group subscription data that is associated with a user and identifies a plurality of different groups, each group being hosted by a corresponding client system. The group subscription data indicates that the user is subscribed to receive resource updates from the plurality of different groups. An aggregated set of resource updates is generated by aggregating resource updates associated with resources in the plurality of different groups. An integrated view renders the aggregated set of resource updates and includes an action user input mechanism representing a computing action to be performed in a corresponding one of the groups associated with at least one resource update. Based on user actuation of
(Continued)

the action user input mechanism, a machine instruction instructs the client system, that hosts the corresponding group, to perform the computing action.

18 Claims, 26 Drawing Sheets

(51) Int. Cl.
*G06Q 10/10* (2012.01)
*H04L 29/06* (2006.01)
*H04L 12/927* (2013.01)

(58) Field of Classification Search
CPC .......... H04L 51/32; H04L 67/42; H04W 4/08; H04W 68/00; H04W 4/21; G06Q 10/10
See application file for complete search history.

(56) References Cited

U.S. PATENT DOCUMENTS

| | | | | |
|---|---|---|---|---|
| 2008/0182563 A1* | 7/2008 | Wugofski | .............. | G06Q 30/02 455/414.2 |
| 2009/0089380 A1* | 4/2009 | Wang | .................. | G06F 16/951 709/206 |
| 2009/0138562 A1* | 5/2009 | Schmulen | ............ | G06Q 10/107 709/206 |
| 2011/0196933 A1* | 8/2011 | Jackson | .................. | H04L 51/18 709/206 |
| 2011/0225232 A1* | 9/2011 | Casalaina | ............. | G06F 3/0481 709/203 |
| 2011/0274258 A1* | 11/2011 | Casalaina | ........... | H04M 7/0057 379/93.01 |
| 2011/0307695 A1* | 12/2011 | Slater | .................... | G06F 21/604 713/163 |
| 2012/0304079 A1* | 11/2012 | Rideout | .................. | H04L 51/32 715/758 |
| 2013/0031487 A1* | 1/2013 | Olsen | ...................... | H04L 51/32 715/751 |
| 2014/0081953 A1* | 3/2014 | Ingram | .................. | G06Q 10/10 707/722 |
| 2014/0090037 A1* | 3/2014 | Singh | ..................... | G06F 21/335 726/7 |
| 2014/0302470 A1* | 10/2014 | Zapantis | ................ | G09B 19/00 434/236 |
| 2015/0278763 A1* | 10/2015 | Patil | ........................ | G06F 16/35 705/301 |

FOREIGN PATENT DOCUMENTS

| | | | |
|---|---|---|---|
| JP | 2013175999 | * | 9/2013 |
| JP | 2013175999 A | | 9/2013 |
| KR | 20110108123 | * | 10/2011 |
| KR | 20110108123 A | | 10/2011 |

OTHER PUBLICATIONS

"Office Action Issued in European Patent Application No. 15716256. 1", dated Jun. 24, 2019, 6 Pages.
"Office Action Issued in European Patent Application No. 15716256. 1", dated Apr. 19, 2021, 8 Pages.
"Office Action Issued in Indian Patent Application No. 201647032650", dated Nov. 12, 2020, 8 Pages.
"Office Action Issued in Korean Patent Application No. 10-2016-7026965", dated Jul. 5, 2021, 11 Pages.
"Final Office Action Issued in Korean Patent Application No. 10-2016-7026965", dated Jan. 18, 2022, 7 Pages.
10291745, filed May 14, 2019.
"Notice of Allowance Issued in Korean Patent Application No. 10-2016-7026965", dated Mar. 16, 2022, 5 Pages.

* cited by examiner

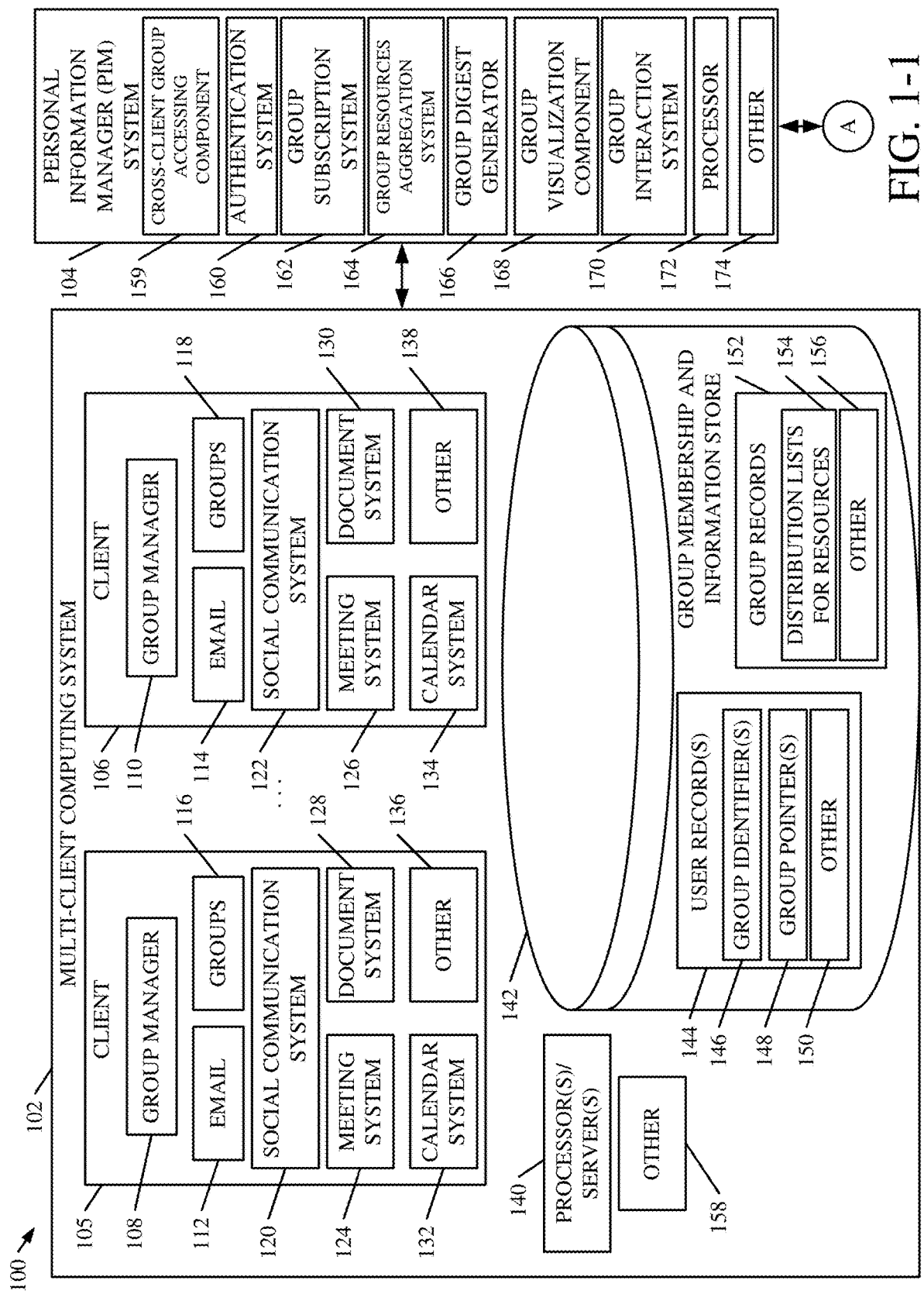

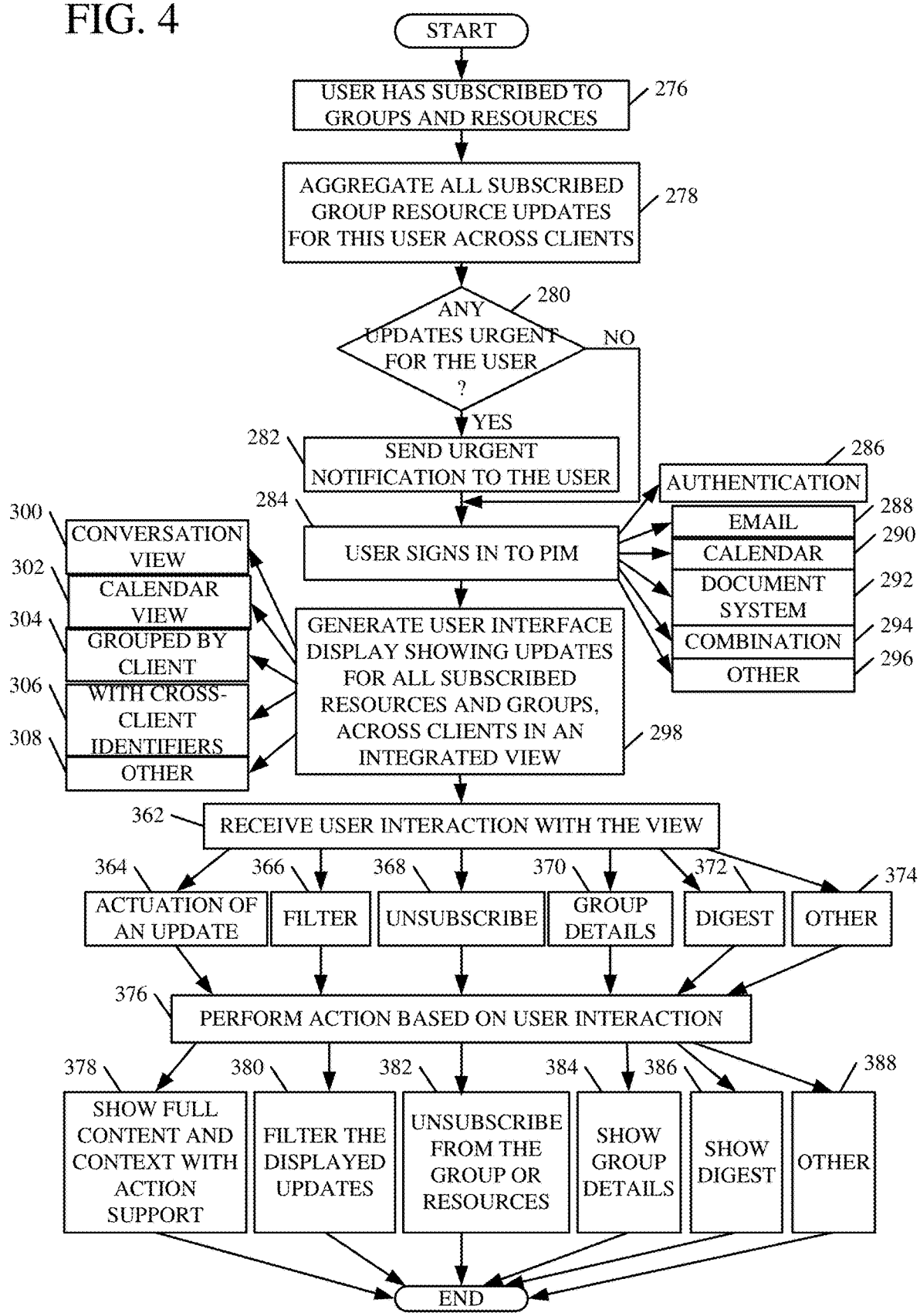

INTEGRATION OF CLIENT SYSTEM GROUPS

CROSS-REFERENCE TO RELATED APPLICATION

The present application is a continuation of and claims priority of U.S. patent application Ser. No. 14/229,057, filed Mar. 28, 2014, the content of which is hereby incorporated by reference in its entirety.

BACKGROUND

Computer systems are currently in wide use. Some such computer systems include multi-tenant systems, and multi-instance systems.

In a multi-tenant system, a plurality of different client organizations (or tenants) can be served by a server that is running software. In some such systems, a single instance of the software is run by the server, and that single instance is used to serve multiple different tenants. In a multi-instance architecture, multiple different software instances serve the multiple different client organizations.

In either architecture, some users can have access to the information for multiple different clients. For instance, it may be that a given user is working with multiple different client organizations, sometimes in different capacities. As an example, in some small to mid-size businesses, a user in such a business may partner with an organization that is outside of his or her own home computing system. A user may thus partner with a customer, a vendor, a contractor, etc.

Therefore, it is common for some users to use information from multiple different clients in order to perform their tasks or jobs. In such cases, a user is normally provided with authentication information for logging onto the different systems that are used by the multiple different clients. This can result in a user experience that is somewhat frustrating.

For instance, in some multi-client environments, a user's access to resources is limited to the specific client that the user is logged onto. Therefore, if a user wishes to obtain access to resources in a different client, the user needs to log off from the existing client, navigate to a new client page and log on again. This can be an especially unpleasant user experience because some enterprise organizations use social communication, through shared conversation spaces, to communicate relevant information. Some such social communication includes site mailboxes, groups, social network communication systems, among others. Each client normally has a conversation store that stores its conversations, and the different conversation stores cannot be easily accessed or shown, side-by-side, within a user's home computing system experience.

Given these types of scenarios, it can be difficult for a given user to keep track of all of the important information that the user wishes to follow. Updates can happen in many different places, on all the different clients that the user is attempting to follow. Such updates can be made through e-mail, through social networking, through document management systems, on calendar or meeting systems, etc. If a user needs to log in to each different client, independently, in order to check all of these resources, it can be difficult to obtain all of the information that the user wishes to have, in order to perform his or her tasks.

Many different types of computer systems currently support groups. That is, a user can join a group, and have access to a plurality of different types of resources for that group. For instance, the group may provide conversation resources that allow a user to be part of various different conversations for the group. The group may provide document management and calendar resources that allow the user to review documents that are relevant to the group and schedule and attend meetings, telephone appointments, or other types of conferences, that are relevant to the group. Similarly, some groups have social network resources that allow a user to use social network communication that is relevant to the group. These are some examples of resources that are available to various different groups.

The discussion above is merely provided for general background information and is not intended to be used as an aid in determining the scope of the claimed subject matter.

SUMMARY

A method performed by a computing system comprises accessing group subscription data that is associated with a user and identifies a plurality of different groups, each group being hosted by a corresponding client system. The group subscription data indicates that the user is subscribed to receive resource updates from the plurality of different groups. Based on the group subscription data, an aggregated set of resource updates is generated by aggregating resource updates associated with resources in the plurality of different groups. An integrated view renders the aggregated set of resource updates and includes an action user input mechanism corresponding to at least one of the resource updates and representing a computing action to be performed in a corresponding one of the groups associated with the at least one resource update. Based on user actuation of the action user input mechanism, a machine instruction instructs the client system, that hosts the corresponding group, to perform the computing action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2 is a more detailed block diagram of one embodiment of a group subscription system.

FIG. 4 is a flow diagram illustrating one embodiment of the operation of the architecture shown in FIG. 1 in aggregating and displaying updates for groups, across clients, in an integrated view.

DETAILED DESCRIPTION

Figures 1, 2:
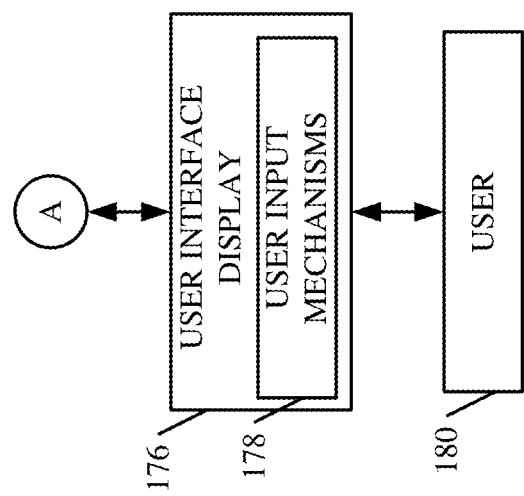
FIGS. 1-1 and 1-2 (collectively FIG. 1) show a block diagram of one embodiment of a multi-client group communication architecture.

FIGS. 1-1 and 1-2 (collectively FIG. 1) show a block diagram of one exemplary multi-client group communication architecture 100. Architecture 100 includes multi-client computing system 102 and personal information manager system 104. Multi-client computing system 102 can illustratively be a multi-tenant computing system or a multi-instance computing system. In either case, it illustratively includes a plurality of different clients 105-106. Each client illustratively includes a group manager 108, 110 an e-mail system 112, 114, a set of groups 116, 118, a social communication system 120, 122, a meeting system 124, 126, a document management system 128, 130, a calendar system 132, 134, and they can include other components 136, 138 as well.

In the embodiment shown in FIG. 1, multi-client computing system 102 also illustratively includes one or more processors or servers 140, as well as a group membership and information store 142. Data store 142 illustratively includes user records 144 that have group identifiers 146 that identify the various groups that a given user belongs to, along with group pointers 148 that are pointers to the groups identified by the group identifiers 146. The user records 144 can include other items 150 as well.

In the embodiment shown in FIG. 1, data store 142 also includes group records 152. The group records 152 illustratively include distribution lists (or other lists) 154 for the various resources offered for the different groups. In addition, the group records can include other information 156 as well. Computing system 102 can also include other items. This is illustrated by block 158.

Personal information manager (PIM) system 104 illustratively includes cross-client group accessing component 159, authentication system 160, group subscription system 162, group resource aggregation system 164, group digest generator 166, group visualization component 168, group interaction system 170, processor 172 and it can include other items 174. In one embodiment, PIM system 104 generates user interface displays 176 that have user input mechanisms 178. User 180 illustratively interacts through user input mechanisms 178, in order to control and manipulate PIM system 104. In one embodiment, PIM system 104 can include an e-mail system, a document management system, a calendar system, or a wide variety of other systems.

Before describing the operation of architecture 100 in more detail, some of the items shown in architecture 100 will be described. Group managers 108 and 110 illustratively manage the groups that are hosted by the various clients 105 and 106. That is, they can keep track of the membership of the groups, they can take actions to send updates, notifications, messages, meeting requests, etc. They can also perform document management tasks to manage documents related to each given group.

Groups 116 and 118 are illustratively the various groups that are hosted by the different clients 105-106. E-mail systems 112-114 are illustratively the e-mail systems used by the different clients 105-106. They can be the same or different e-mail systems. Social communication systems 120-122 are illustratively the social network communication systems that are hosted or supported by the various clients 105-106. Meeting systems 124-126 allow users of the various clients to schedule and attend meetings. Document management systems 128 and 130 manage the various documents, either themselves, or under the operation of other components of a corresponding client. Calendar systems 132 and 134 are illustratively the scheduling, calendar, and appointment systems used by the various clients 105-106.

In PIM system 104, cross-client group accessing component 159 operates in conjunction with other items to give user 180 access to all the groups the user is interested in through one, integrated view. This is done even though they are hosted by different clients. Authentication system 160 allows the user to sign in to the system. Group subscription system 162 allows the user to subscribe to various groups in multi-client computing system 102. Group resource aggregation system 164 aggregates the resources of the groups that the user has subscribed to, and group visualization component 168 presents updates that are aggregated by system 164, in an integrated view, and across clients, to user 180. Group digest generator 116 generates digests that can provide certain updates, in summary form, and group interaction system 170 allows user 180 to interact with the various displays that are generated.

Figure 1A:
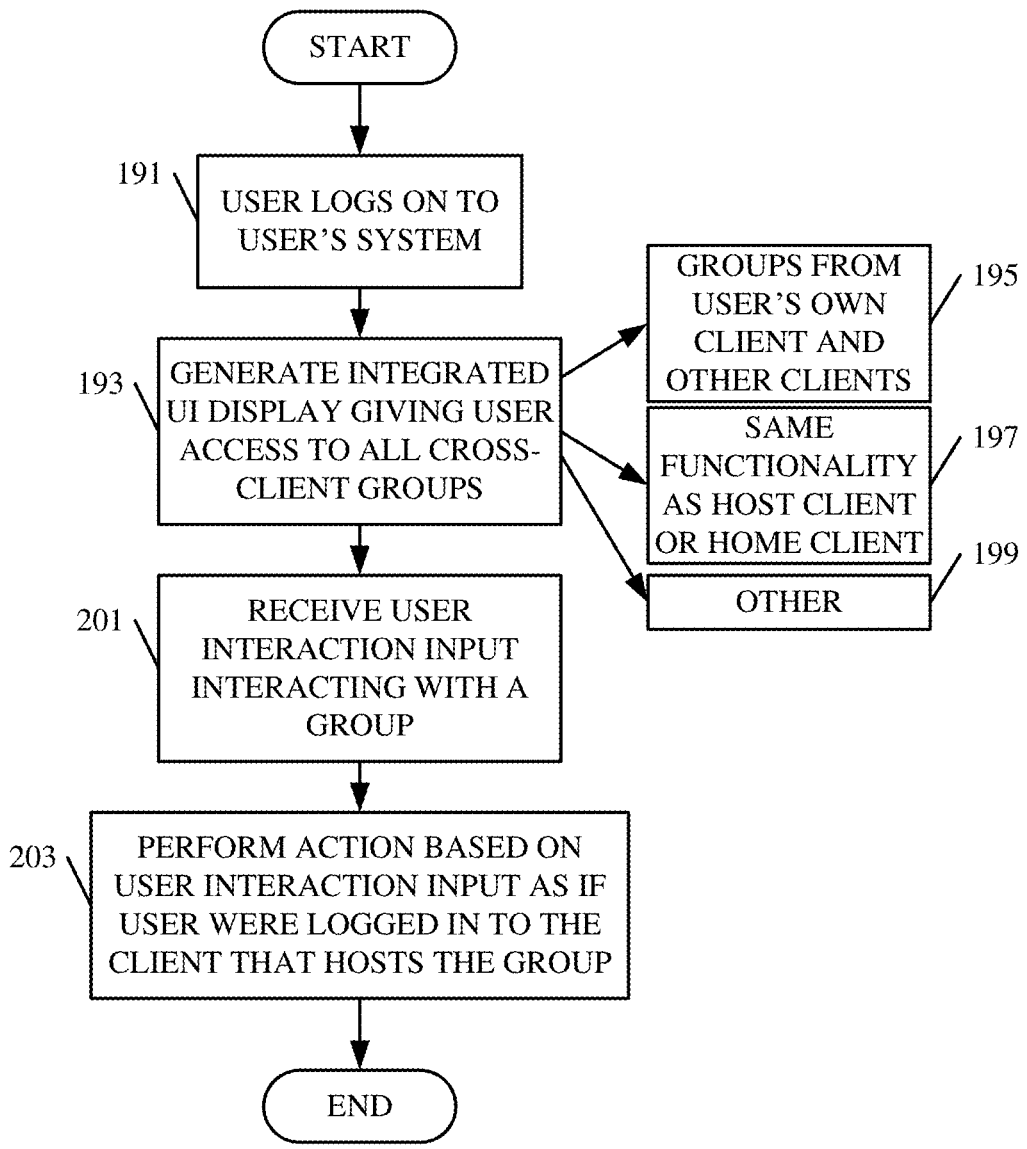
FIG. 1A is a flow diagram illustrating one embodiment of the operation of the architecture shown in FIG. 1 in providing cross-client access to groups and group functionality from an integrated view.
Figure 2:
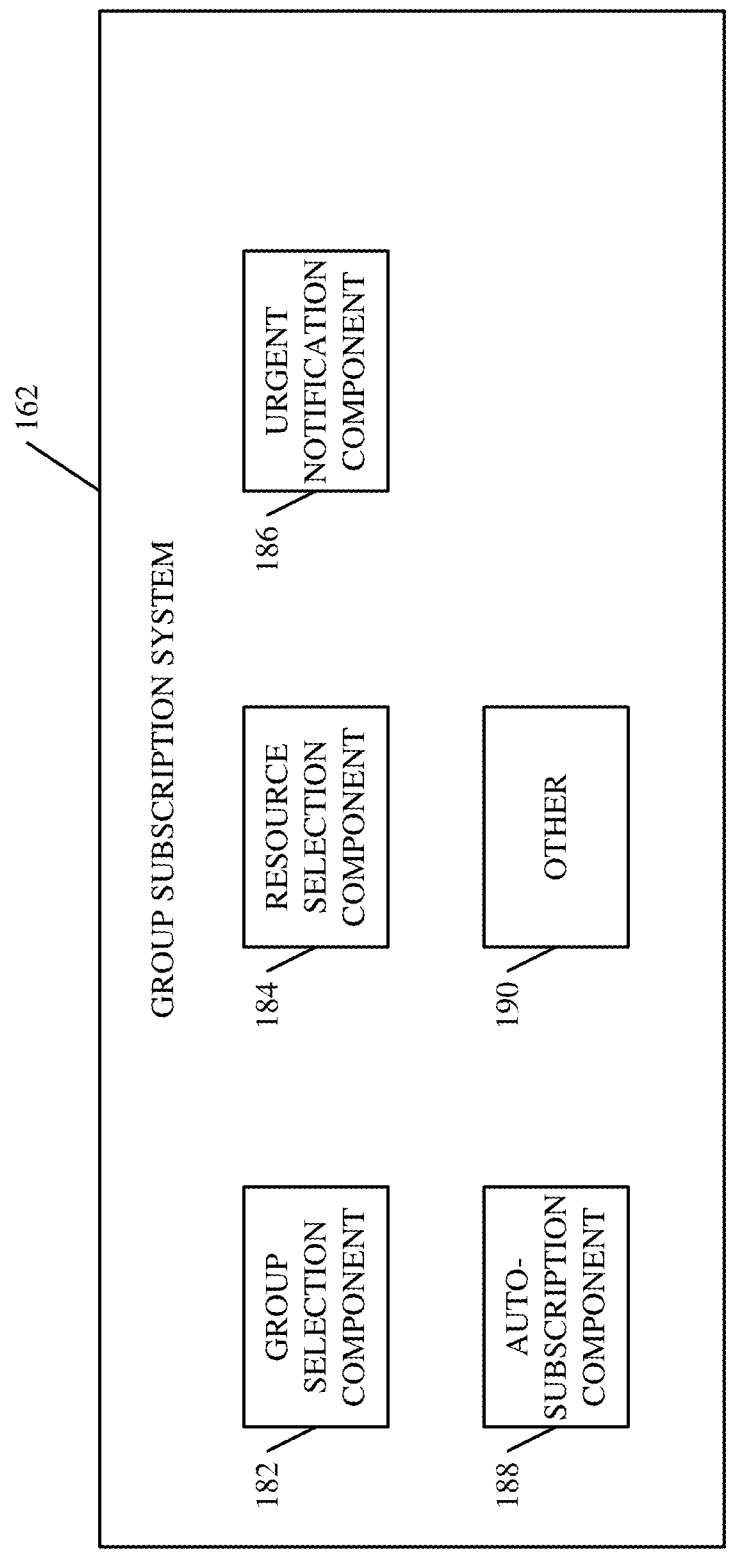

FIG. 1A is a flow diagram illustrating one embodiment of the operation of the architecture shown in FIG. 1 in providing user 180 with access to all the groups the user is interested in, across multiple different clients 105-106, in a single integrated view. This is done, even though the user 180 does not separately log on to all of the different clients that host all of the different groups. In one embodiment, user 180 first accesses the user's own, home system. This is indicated by block 191 in FIG. 1A. This can be done, for instance, by the user logging on to PIM system 104, or in other ways.

Cross-client group accessing component 159 then uses visualization component 168 to generate a user interface display that provides user 180 with access to all of the groups, across all of the clients, that user 180 is interested in, in a single, integrated view. This is indicated by block 193 in FIG. 1A. In one embodiment, user 180 is provided with access to groups from his or her own home system as well as to groups from other clients as well, even though user 180 has only logged into his or her own system. This is indicated by block 195.

Also, in one embodiment, the integrated view provides user 180 with support for all of the interactive functionality that the user has with groups in his or her home system. It can also provide support for the interactive functionality the user would have if he or she had logged in to the particular client that hosts the group. This is indicated by block 197 in FIG. 1A. By way of example, if the group is a social networking group that would allow the user to "like" a post, then the integrated view provides the user with functionality to "like" posts as well. Similarly, if the group is an email group that would allow the user to "reply all", then the integrated view allows the user to perform that function as well. These are only examples of how user 180 is provided with cross-client access to groups, with the same interaction functionality as if the group were being hosted by the user's own home system, or as if the user had logged on to the hosting system.

The integrated view can be generated in other ways as well. This is indicated by block 199 in FIG. 1A.

Group interaction system 170 can then receive a user interaction with functionality on the integrated view. This is indicated by block 201. For instance, the user 180 can provide a "like" input, a "reply all" input, an "accept" input to a meeting request, etc. These are exemplary interactions only.

System 170 then performs an action, based on the user's interaction input. This is done, as if the group were hosted by the user's own system, or as if the user 180 had logged on to the hosting client. This is indicated by block 203 in FIG. 1A. A variety of different examples of aggregated views will now be described, along with a variety of different examples of user interactions.

FIG. 2 shows a more detailed block diagram of group subscription system 162. In the embodiment shown in FIG. 2, group subscription system 162 illustratively includes group selection component 182 that allows user 180 to select groups to subscribe to. System 162 also illustratively includes resource selection component 184 that allows user 180 to select certain resources, within a selected group. Urgent notification component 186 allows the user to identify various different kinds of notifications that are urgent to the user and that should be sent to the user in a more direct or urgent manner Auto-subscription component 188 can perform certain automatic subscription operations to automatically subscribe a user to a group or resource. System 162 can include other items 190 as well.

Figure 3:
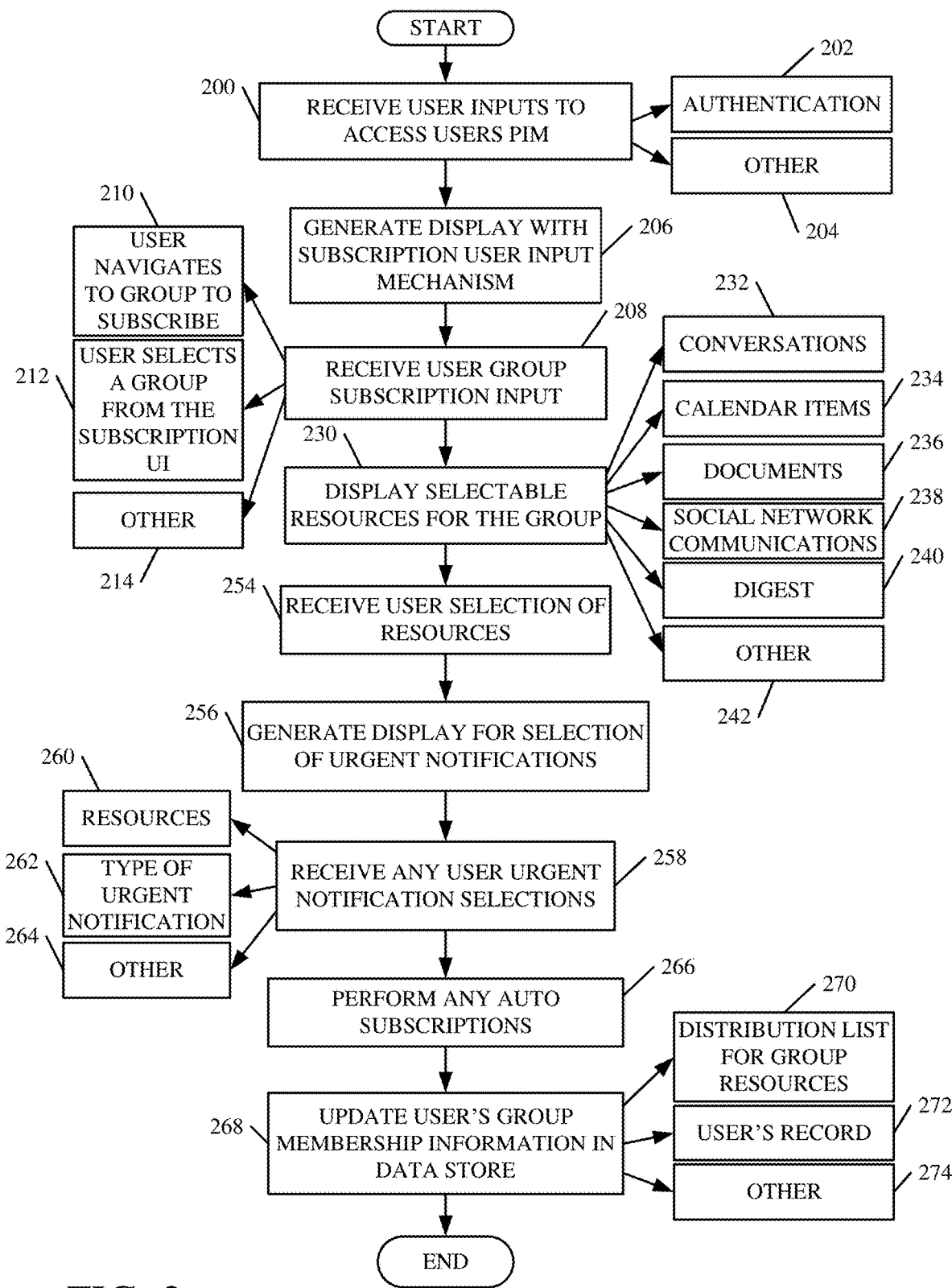
FIG. 3 is a flow diagram illustrating one embodiment of the operation of the architecture shown in FIG. 1 in allowing a user to subscribe to groups hosted by various different clients.

FIG. 3 is a flow diagram illustrating one embodiment of the operation of architecture 100 in allowing user 180 to subscribe to various groups and resources for the various clients 105-106. Authentication system 160 in PIM system 104 first receives user inputs from user 180 indicating that the user is accessing PIM system 104. This is indicated by block 200 in FIG. 3. The user inputs can take a variety of different forms. For instance, they can be authentication inputs (such as a username and password) 202, or other inputs 204.

System 104 then generates a display that includes a subscription user input mechanism. This is indicated by block 206 in FIG. 3. The group subscription system 162 then receives a user input indicating that the user 180 wishes to subscribe to a group. This is indicated by block 208. This can be done in a variety of different ways. For instance, in one embodiment, user 180 can navigate to a page for a given group and actuate a subscription mechanism in order to subscribe to that group. This is indicated by block 210. In another embodiment, the user can select a group from a subscription user interface element in order to subscribe to the selected group. This is indicated by block 212. The user can provide inputs to select a group, in order to subscribe to the group, in other ways as well, and this is indicated by block 214.

Figure 3A:
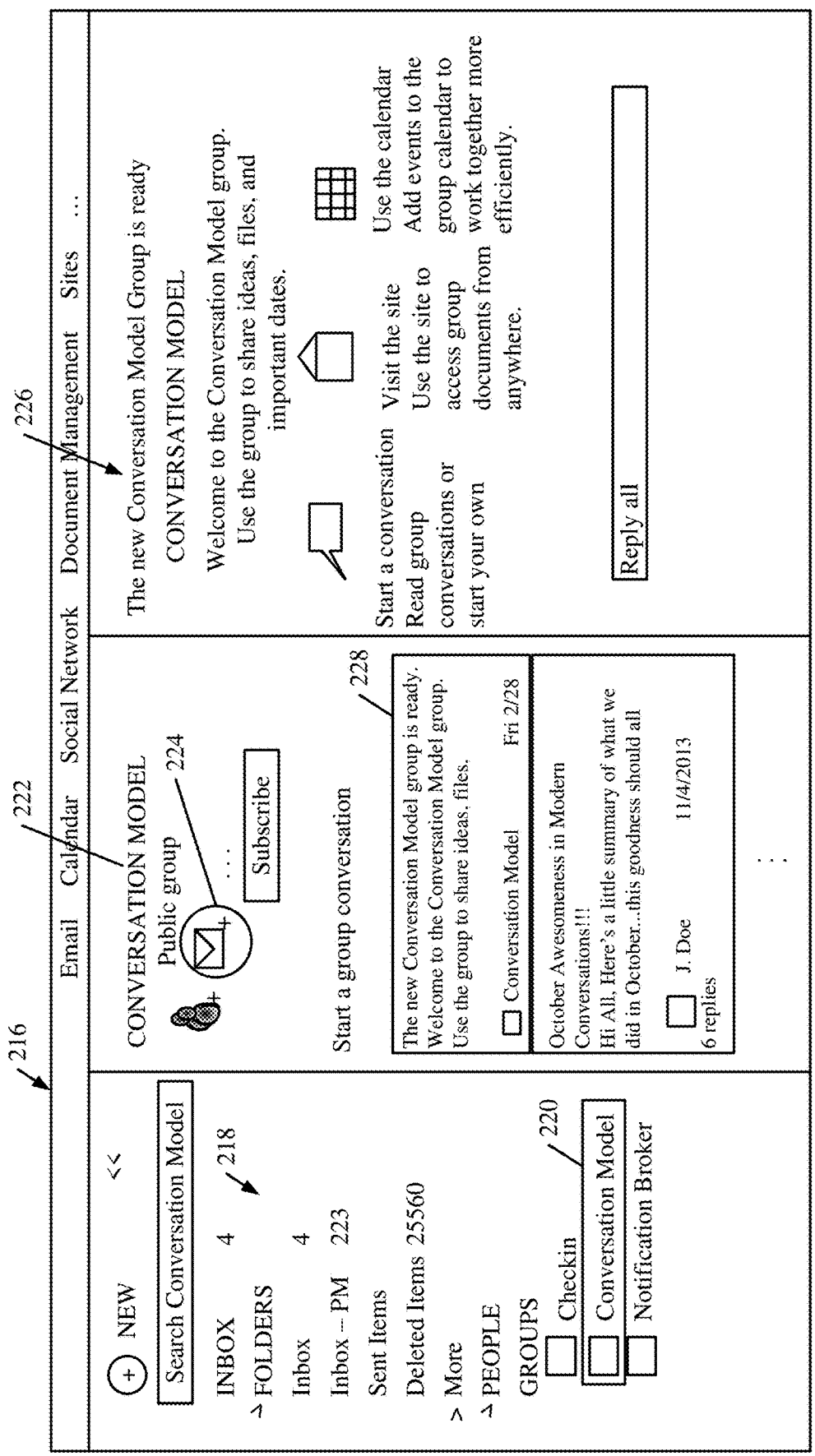
FIGS. 3A-3C are exemplary user interface displays.

FIG. 3A shows one exemplary subscription user interface display 216. Display 216 illustratively includes a navigation pane 218 that allows the user to navigate through various items of the user's e-mail system, to view various contacts, and to view various groups. It can be seen in FIG. 3A that the user has selected a group user input mechanism 220. Display 216 also includes a selected group pane 222.

Pane 222 illustratively includes information corresponding to the selected group user input mechanism 220. Pane 222 illustratively includes a subscribe user input mechanism 224. If the user actuates user input mechanism 224, the user can illustratively subscribe to the group corresponding to the selected group user input mechanism 220.

Display 216 also illustratively includes a more detailed display section 226. Section 226 shows a detailed display of the content and context for a corresponding item 228 that is selected in pane 222. Thus, pane 222 shows a view of information corresponding to the selected group user input mechanism 220, and pane 226 shows a full set of content and context for a selected item 228 in pane 222.

Once the user actuates the subscribe user input mechanism 224, resource selection component 184 (in FIG. 2) illustratively displays a set of selectable resources for the group that the user is subscribing to. This is indicated by block 230 in the flow diagram of FIG. 3. Some resources that are supported by some groups, and that can be selected by a user, include conversations 232, calendar items 234, documents 236, social network communications 238, a digest 240, and it can include other resources 242 as well.

Figure 3B:
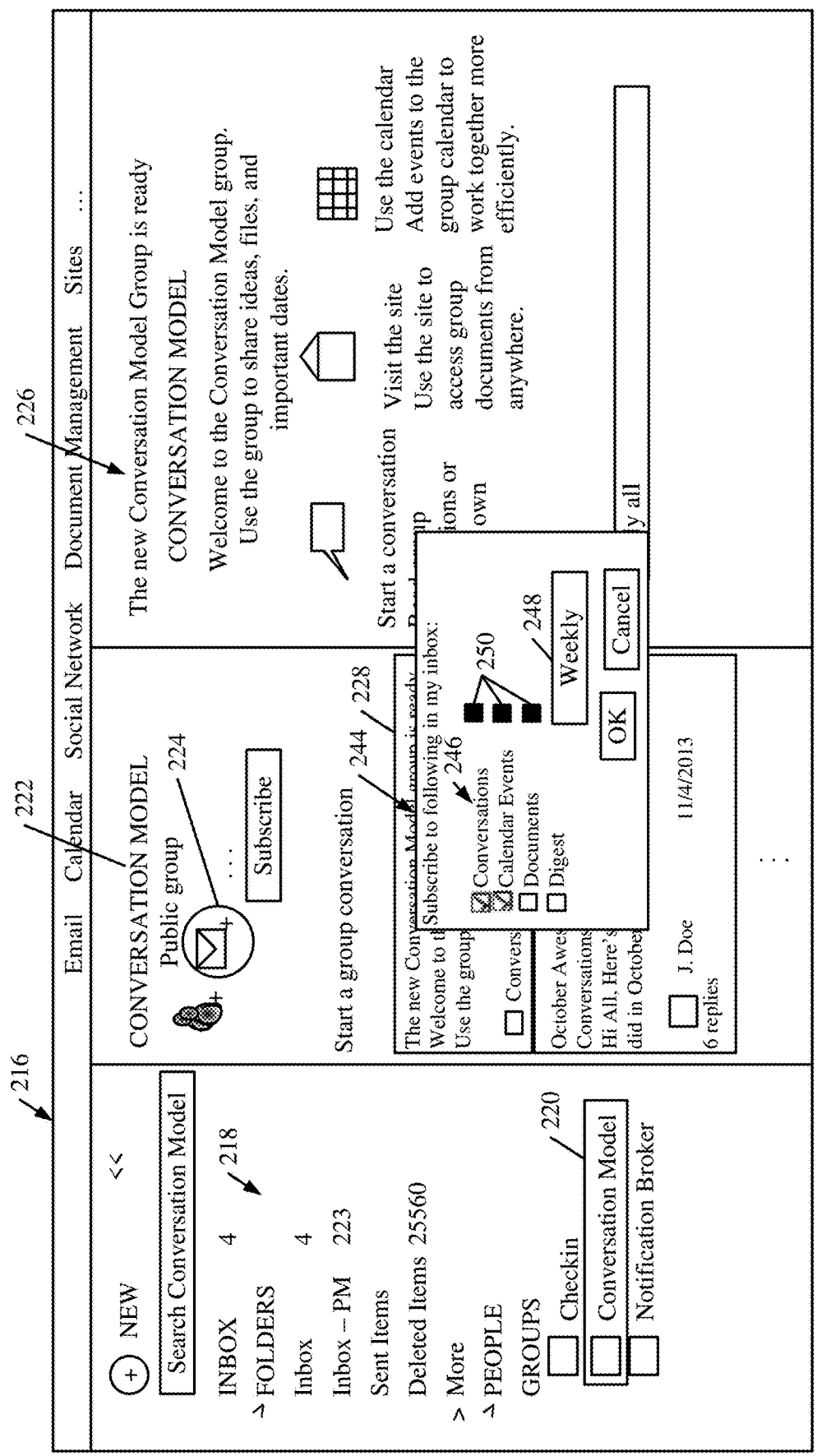

FIG. 3B shows one embodiment of a user interface display that illustrates this. FIG. 3B shows user interface display 216 of FIG. 3A, and similar items are similarly numbered. FIG. 3B also shows that resource selection user input display 244 is now displayed on user interface display 216. Display 244 includes a set of selectable resources 246 that are supported by the group that the user has just subscribed to. The resources 240 can be selected by the user by actuating a selection user input mechanism, such as the checkboxes illustrated. In the embodiment shown in FIG. 3B, the resources for the "conversation model" group include conversations, calendar events, documents and a digest.

This can be useful in a variety of different scenarios. For instance, it may be that user 180 is interested in different groups, for different reasons. As an example, it may be that a user is interested in attending all meetings, and therefore the user wishes to be notified when meetings are scheduled and when they are changed. However, the user may not be interested in seeing updates on every conversation corresponding to a group. Likewise, it may be that a user is co-authoring a document for a group, so the user wishes to see whenever document changes are made, but the user need not see all the conversations or attend all the meetings for the group. Thus, by allowing a user to select the various resources for which to receive updates from a given group, the user can better manage his or her notification system (such as inbox) to receive only information that the user deems relevant.

Display 244 also allows the user to set the frequency with which the user wishes to receive updates. This can be selected, for instance, by actuating drop down menu 248 in display 244.

Display 244 also illustratively includes urgent display user input mechanisms 250. One mechanism 250 is illustratively associated with each of the resources 246. If the user actuates one of user input mechanisms 250, the user will illustratively be notified in a more urgent manner, for updates occurring from that resource, than for updates from other selectable resources.

Figure 3C:
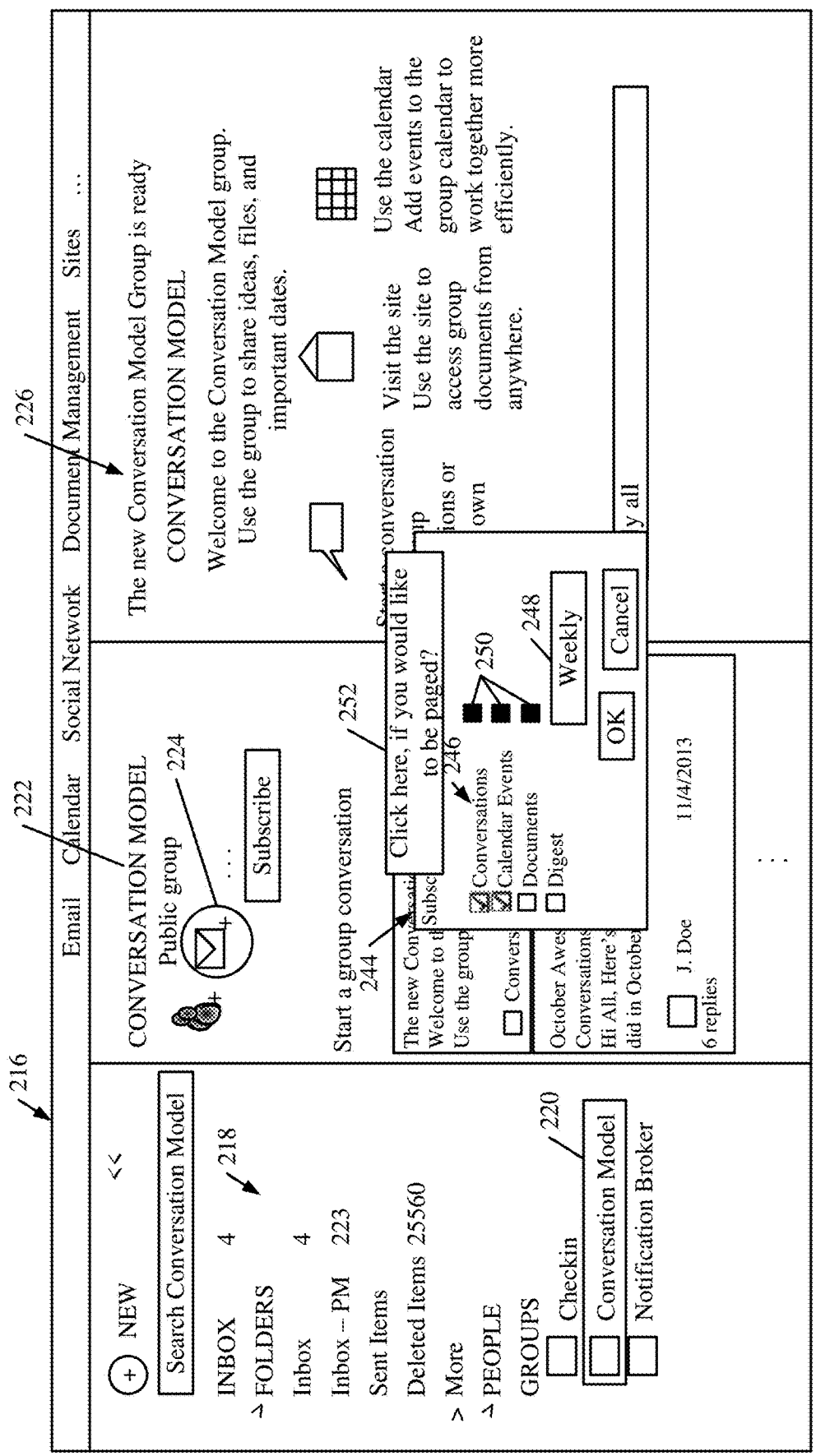

FIG. 3C shows a user interface display that is similar to that shown in FIG. 3B, and similar items are similarly numbered. However, FIG. 3C also includes confirmation display 252. Display 252 illustratively allows the user to confirm that the user wishes to be urgently notified (such as paged, called on his or her telephone, etc.) for updates generated by the selected resource.

Returning again to the flow diagram of FIG. 3, receiving user selection of resources on display 244 is indicated by block 254 in FIG. 3. Generating the display for selection of urgent notifications of the different resources is indicated by block 256, and receiving any user urgent notification selections is indicated by block 258. In one embodiment, the user can select individual resources 260 for which to receive urgent notifications. The user can also, in one embodiment, select the type of urgent notification (such as telephone call, page, text message, etc.) as indicated by block 262. The user can define urgent notifications in other ways as well, and this is indicated by block 264.

At some point during the subscription process, it may be that auto-subscription component 188 automatically subscribes user 180 to receive updates from one or more groups. In order to perform an auto-subscription, it may be that component 188 determines that a given user does not have access to group functionality for a particular group or client. If a user is auto-subscribed to a group, they may receive the notifications in a form for which they are equipped to receive them (such as e-mail instead of using a full immersive group experience). Performing auto-subscriptions is indicated by block 266 in FIG. 3.

When the user has finished subscribing, group subscription system 162 then updates the user's group membership information in data store 142. This is indicated by block 268 in FIG. 3. For instance, the user can be added to the distribution lists for the group resources that the user has just subscribed to. This is indicated by block 270. The user's record 144 can also be updated to indicate that the user is a member of the group and has subscribed to certain resources. This is indicated by block 272. The user's record 144 or group record 152, or other group membership information, can be updated in other ways as well. This is indicated by block 274.

FIG. 4 is a flow diagram illustrating one embodiment of the operation of architecture 100 in aggregating updates from groups that user 180 has subscribed to and presenting them, and further for receiving user interactions with the presented updates. It is first assumed that user 180 has subscribed to a set of groups and resources. This is indicated by block 276 in the flow diagram of FIG. 4. Group resource aggregation system 164 then aggregates all of the subscribed group resource updates for user 180, across the various clients and groups that the user has subscribed to. This is indicated by block 278.

Urgent notification component 186 (shown in FIG. 2) determines whether any of the aggregated updates have been identified as being urgent by user 180. This is indicated by block 280 in FIG. 4. If so, then the urgent notification is sent to user 180, as defined by user 180 during the subscription process. This is indicated by block 282.

However, if, at block 280, it is determined that none of the updates are urgent, then processing proceeds to block 284, where system 104 waits for user 180 to sign into system 104. Again, user 180 can sign into system 184 using authentication inputs 286, or other inputs. The user can sign into an e-mail system 288, a calendar system 290, a document management system 292, or various combinations of different systems 294, or other systems 296.

Group visualization component 168 then generates a user interface display showing updates for all of the subscribed resources and groups, across clients, in an integrated view. This is indicated by block 298 in FIG. 4. The integrated view can take a wide variety of different forms. For instance, it can be a conversation view 300, it can be a calendar view 302, the updates can be grouped by client as indicated by block 304, the view can have cross-client identifiers 306, or the view can be displayed in other ways as well, as indicated by block 308. FIGS. 4A-4E show a variety of different views.

Figure 4A:
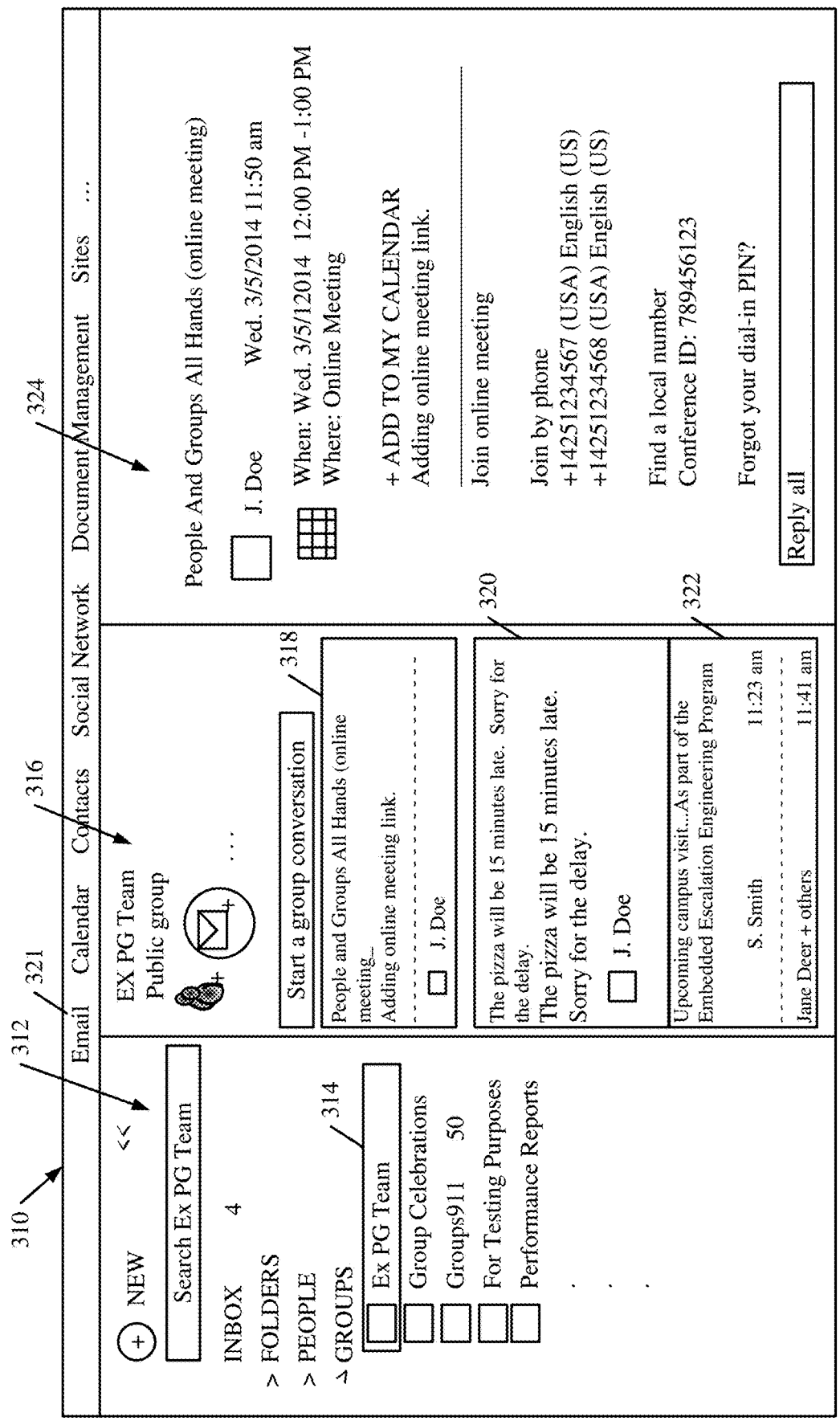
FIGS. 4A-4J show exemplary user interface displays.

FIG. 4A shows one embodiment of a user interface display 310 that illustrates a conversation view. It can be seen that the user has selected the email user input mechanism 321. The conversation view includes a navigation pane 312 that allows the user to navigate through the user's electronic mail, contacts and groups. It can be seen that the user has selected a group user input mechanism 314.

User interface display 310 also includes a conversation pane 316 that includes a plurality of different user input mechanisms 318, 320 and 322, each corresponding to a different conversation within the group identified by group user input mechanism 314. It can be see that the user has selected user input mechanism 318. In that case, detail pane 324 displays full context and content for the latest update in the conversation corresponding to user input mechanism 318. It can be seen that the update is a meeting invitation.

The full content and context that is displayed supports various functionality or actions, without the user needing to navigate back to the group corresponding to user input mechanism 314, and without the user needing to login to that client. Instead, the user is shown the full meeting invitation content (such as the date and location) and the user is provided with full functionality to respond to the meeting invitation. The user can, for instance, add the meeting to the user's calendar, join the meeting either by phone or online, and reply to the meeting invitation.

Figure 4B:
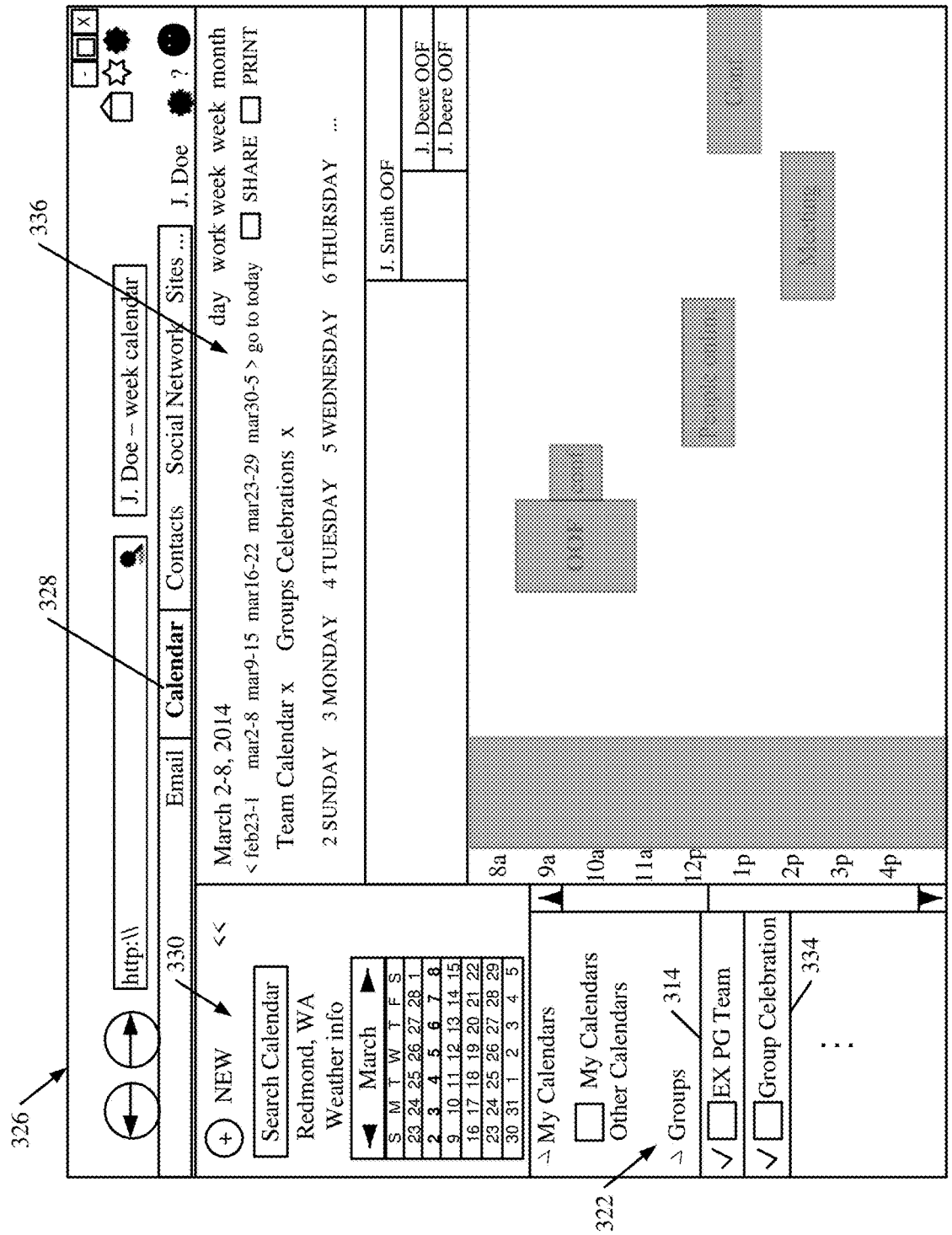

FIG. 4B shows one embodiment of a user interface display 326 that illustrates a calendar view. It can be seen that the user has selected the calendar application by actuating user input mechanism 328, in PIM system 104. Thus, user interface display 326 includes a navigation pane 330 that allows the user to navigate through various dates on the user's calendar and also to view the calendar for the various groups identified in group section 332.

It can be seen that the user has selected two groups by actuating user input mechanisms 314 and 334. Thus, the detailed calendar display 336 displays the calendar for both groups. In one embodiment, the user input mechanisms 314 and 334 can be visually correlated to the meetings or other appointments on detailed calendar display 336. For instance, user input mechanisms 314 and 344 can be colored differently and the appointments or meetings on display portion 336 that correspond to those groups can be similarly colored. This allows the user to quickly see which calendar items belong to which group. Of course, the visual correlation can be provided in other ways as well.

Figure 4C:
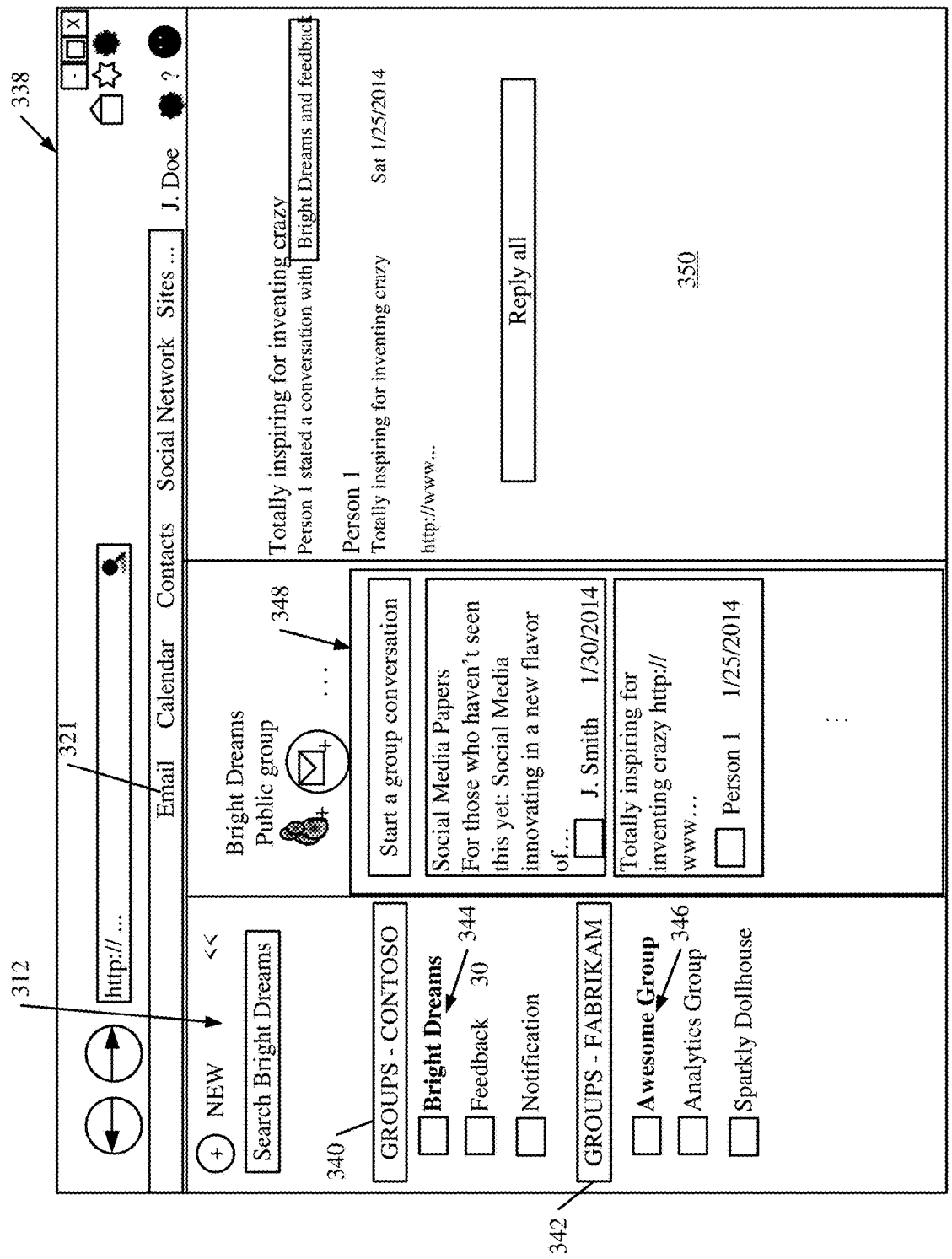

FIG. 4C shows another embodiment of a user interface display 338 in which the e-mail user input mechanism 321 has been actuated in PIM system 104. This is similar to that shown in FIG. 4A. However, FIG. 4C shows that the groups in pane 312 are now grouped by the client that hosts the particular group. For instance, the groups are set out under client identifiers 340 and 342. Client identifier 340 identifies the various groups 344 that are hosted by the Contoso client, while client identifier 342 identifies the various groups 346 that are hosted by the Fabrikam client. If the user actuates one of the user input mechanisms corresponding to groups 344 or 346, then pane 348 identifies various updates in that group, and pane 350 shows detailed context and content information for a particular update highlighted in pane 348.

Figure 4D:
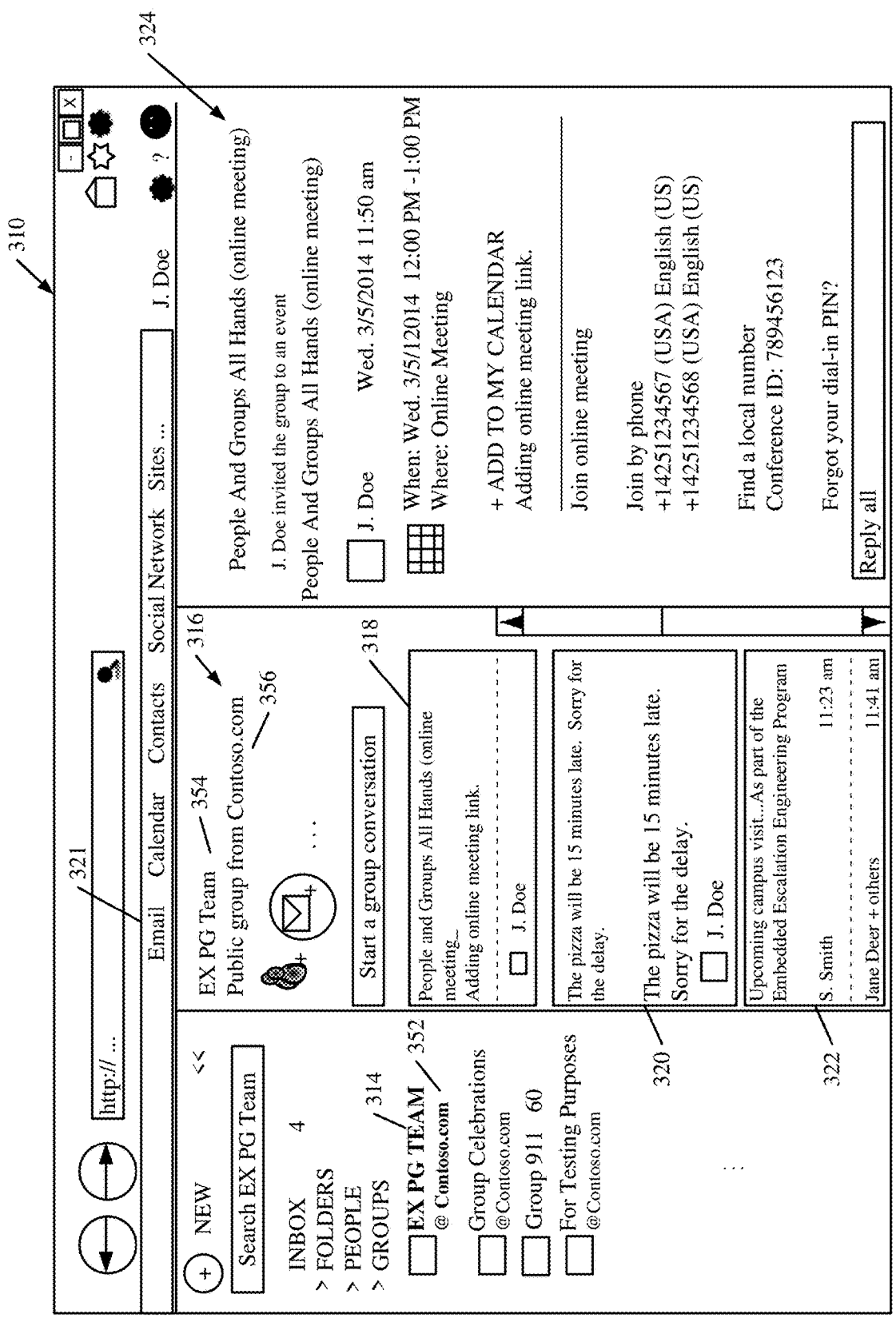
Figure 4E:
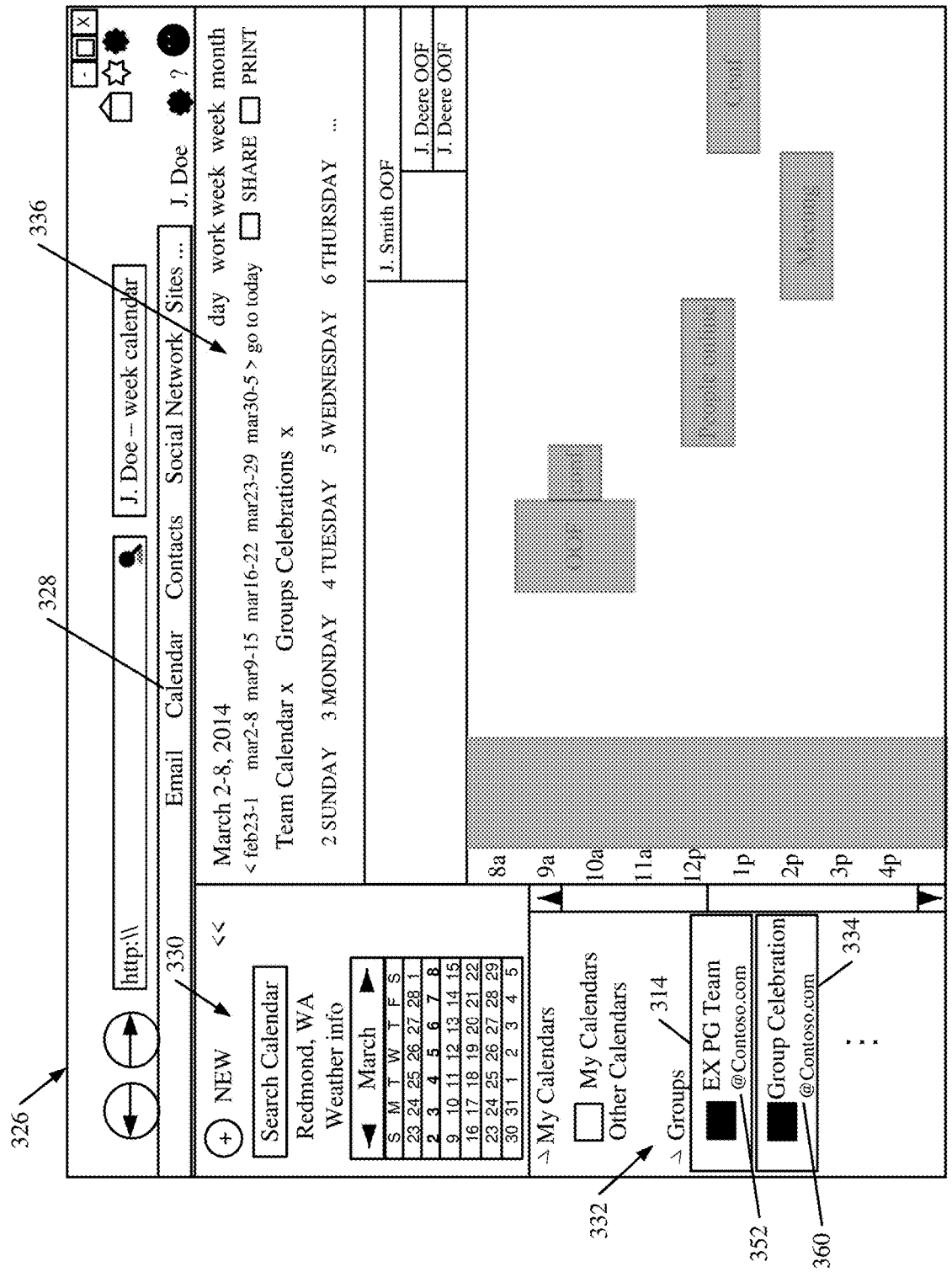

FIGS. 4D and 4E are similar to FIGS. 4A and 4B. That is, FIG. 4D shows a conversation view of user interface display 310, where the user has actuated the e-mail user input mechanism 321. FIG. 4E shows a calendar view with user interface display 326, where the user has actuated the calendar user input mechanism 328. However, it can be seen that FIGS. 4D and 4E have cross-client identifiers associated with each of the items displayed thereon. For instance, it can be seen that the group user input mechanism 314 now has a client identifier 352 that identifies the particular client that hosts that group. Similarly, header 354 in pane 316 also includes a client identifier 356. Similarly, FIG. 4E shows that where the groups are identified, they have cross-client identifiers identifying the particular client that hosts that group. Thus, it can be seen in panel 330 that user input mechanism 314 has the cross-client identifier 352, and user input mechanism 334 has the cross-client identifier 360. These are exemplary views with exemplary cross-client identifiers.

Referring again to the flow diagram of FIG. 4, regardless of the particular integrated view on which the updates are displayed to the user (whether it be one of those shown in FIGS. 4A-4E or a different integrated view), the user can illustratively provide inputs interacting with the integrated view. This is indicated by block 362 in FIG. 4. The user interactions can take a wide variety of different forms. For instance, the user can actuate one of the updates that is displayed. This is indicated by block 364. The user can provide a filter input to filter the various updates, as indicated by block 366. The user can illustratively unsubscribe to a group or resource, as indicated by block 368. The user can provide an input to review group details corresponding to a group, as indicated by block 370. The user can also illustratively provide a digest user input, in order to see a digest for a group. This is indicated by block 372. The user can provide other inputs as well in order to interact with the integrated view, and this is indicated by block 374.

Group interaction system 170 then performs one or more actions based upon the user interaction. This is indicated by block 376. By way of example, if the user actuates an update, group interaction system 170 shows the full content and context, with action support, for the actuated update. This is indicated by block 378. Where the user provides a filter input, group interaction system 170 filters the displayed updates based upon that input. This is indicated by block 380. Where the user provides an unsubscribe input, system 170 communicates with group subscription system 162 to unsubscribe the user from the given group or resource. This is indicated by block 382. Where the user provides an input to show group details, those details are displayed, as indicated by block 384. Either where one of the updates is a digest, or where the user provides an input indicating that the user wishes to review a digest, the digest is displayed as indicated by block 386. Where the user provides another interaction with the integrated view, group interaction system 170 can take other actions as well, and this is indicated by block 388.

Figure 4F:
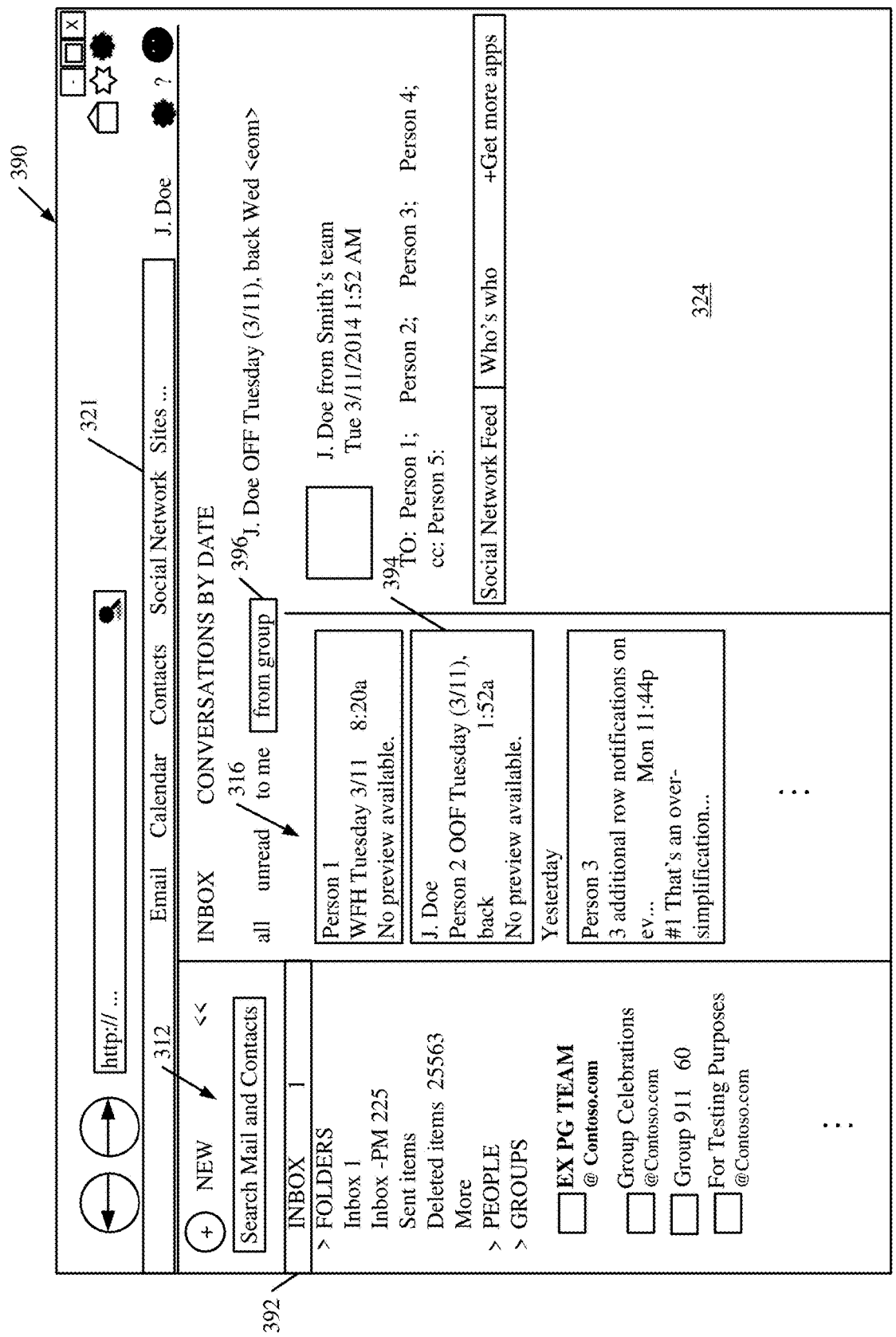

FIGS. 4F-4J show various user interface displays indicating exemplary displays for different interactions that the user can have with the integrated view. FIG. 4F, for example, shows a user interface display 390 that is similar to user interface display 310 shown in FIG. 4A, and similar items are similarly numbered. However, it can be seen in FIG. 4F that the user has selected user input mechanism 392 in pane 312, indicating that the user wishes to view his or her inbox. Thus, pane 316 shows the user's inbox. It can be seen that the user has selected item 394 in his or her inbox so that detailed display portion 324 shows the full content and context of that e-mail, along with full functionality, such as reply, forward, social network feed, etc.

FIG. 4F also shows that the user has provided a filter input. For instance, the user has actuated the "from group" filter user input mechanism 396. Thus, all of the items in pane 316 (in the user's inbox) are updates that are provided from the various groups that the user has subscribed to. That is, all of the user's personal e-mails, and other correspondence that does not come from a subscribed group, are removed from the e-mail display shown in pane 316. This allows the user to quickly perform operations on the various updates that the user has received from his or her subscribed groups.

It will be noted that other filter inputs can be provided as well. For instance, the user can actuate a non-group user input mechanism to show only personal e-mails, or other updates that come from sources other than a subscribed group. The user can filter based on unread updates, based upon recipients, based upon one or more selected groups, etc.

Figure 4G:
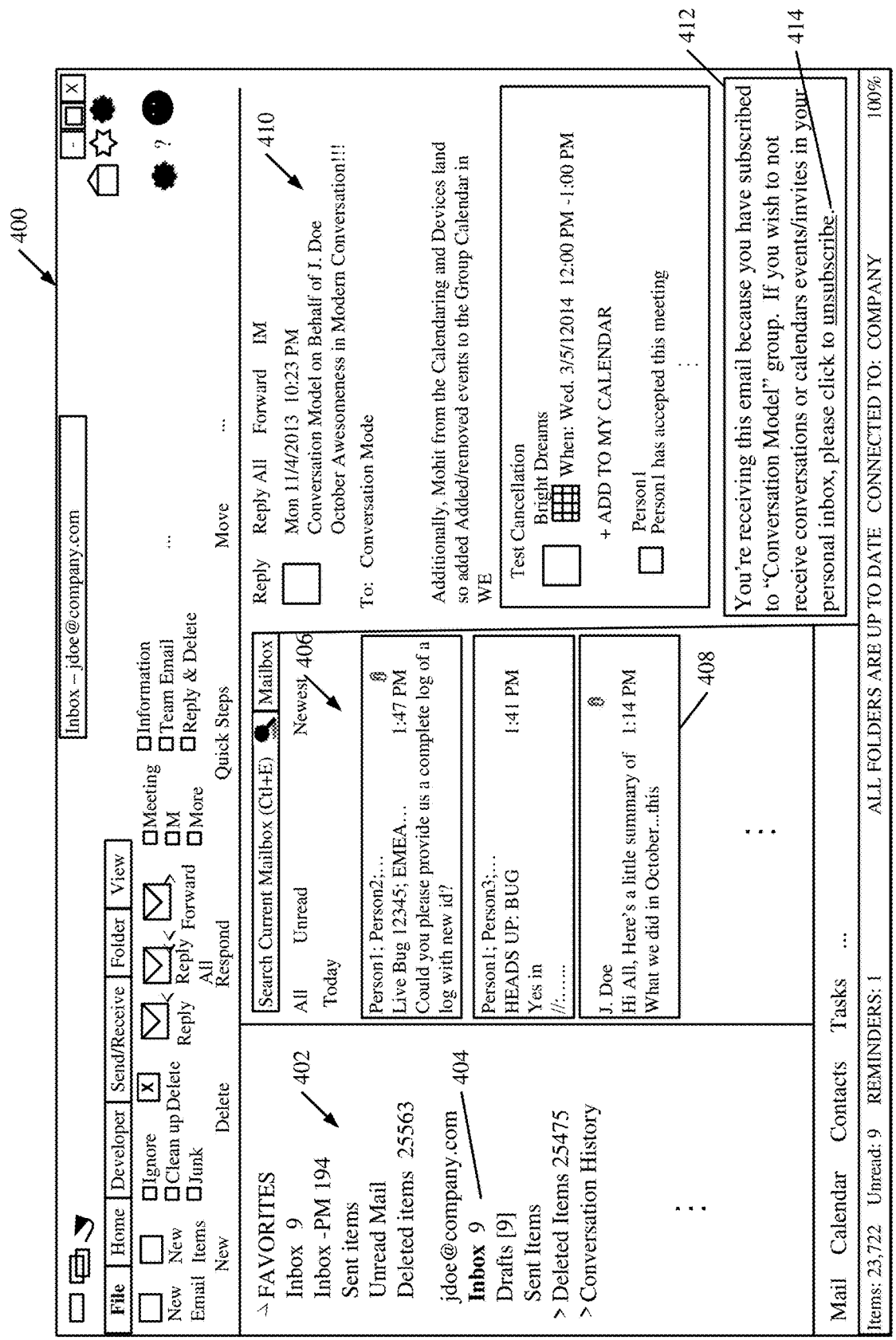

FIG. 4G shows another embodiment of a user interface display 400. User interface display 400 shows a user's personal inbox. Thus, pane 402 allows the user to navigate through various items in the user's electronic mail system. It can be seen that the user has selected the inbox user input mechanism 404. Therefore, pane 406 provides messages received in the user's inbox, arranged in time order. It can be seen that the user has selected one of the messages by selecting user input mechanism 408. Therefore, detailed display section 410 displays the details (full content and context) of the e-mail message or update identified by user input mechanism 408.

FIG. 4G also shows that, in one embodiment, detail section 410 (or any other portion of user interface display 400) can include unsubscribe display element 412. Display element 412 illustratively includes a user actuatable input mechanism 414. Display element 412 indicates that the user has received the update because the user has subscribed to a given group. It also provides the user with the option of unsubscribing from that group by actuating user input mechanism 414. Of course, this is only one example of how a user can be notified in his or her own personal e-mail inbox of an update generated from a subscribed group and provided with the opportunity to unsubscribe. Other examples can be used as well.

Figure 4H:
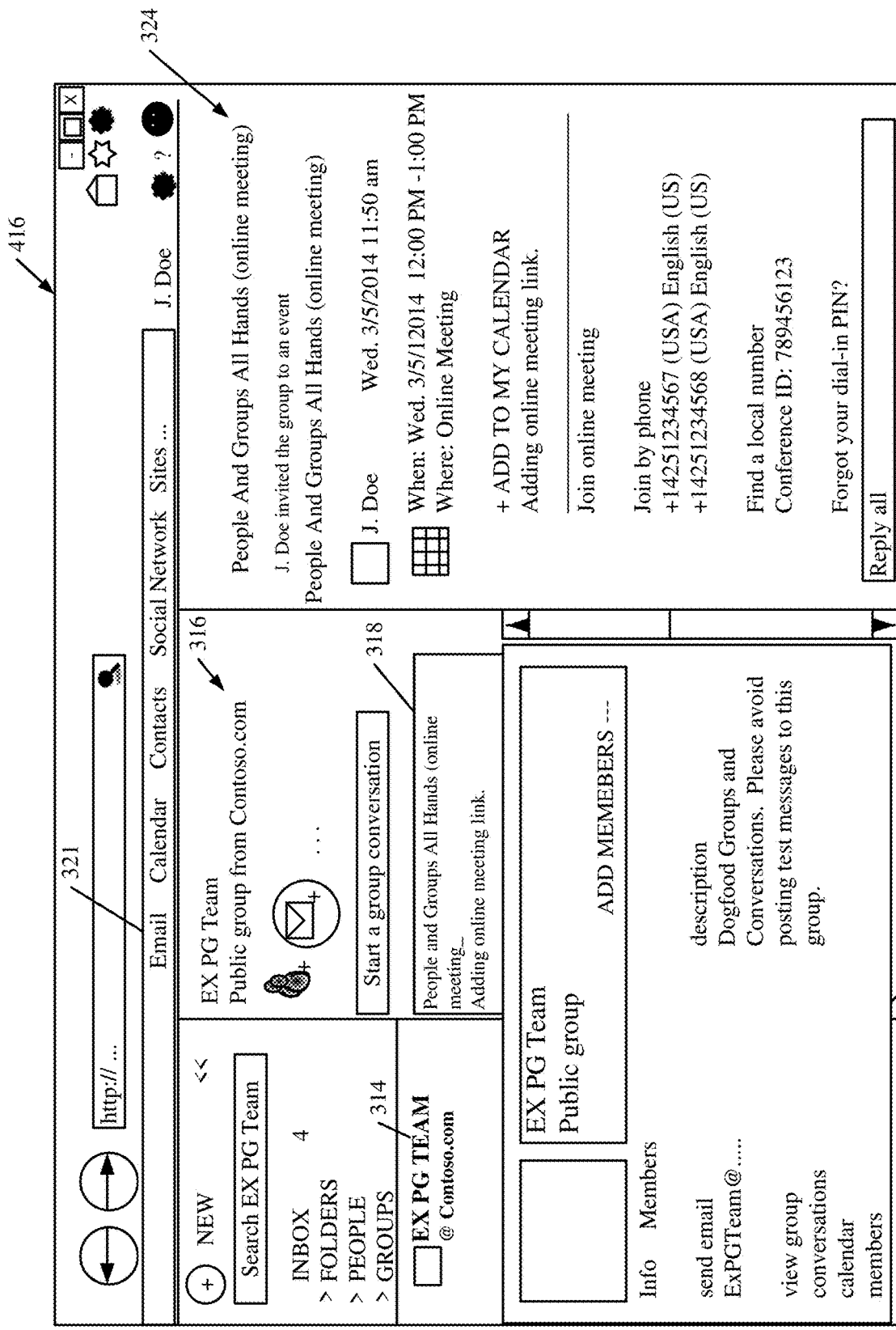

FIG. 4H shows another embodiment of a user interface display 416. Display 416 is similar to display 310 shown in FIG. 4A, and similar items are similarly numbered. However, it can be seen that the user has actuated the group user input mechanism 314 (such as by double clicking it, tapping it, or otherwise actuating it). Therefore, group interaction system 170 displays group detail pane 418 that displays the various details of the group corresponding to user input mechanism 314. For instance, the details can include information about the group, members of the group, a description of the group, the electronic mail address of the group, the conversations and calendar for the group, etc.

Figure 4I:
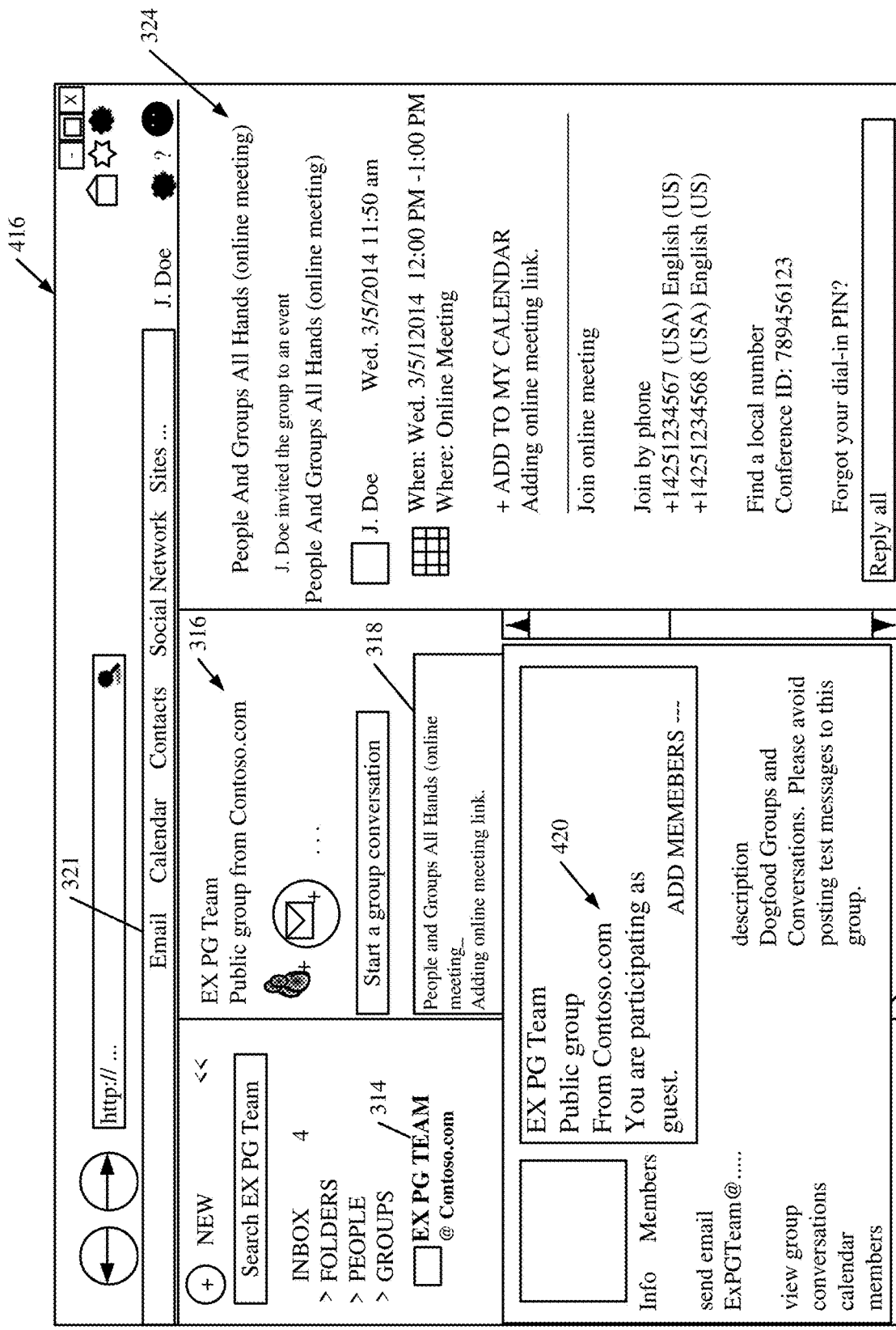

FIG. 4I is similar to FIG. 4H, and similar items are similarly numbered. However, it can be seen in FIG. 4I that pane 418 also includes a cross-client identifier 420. Identifier 420 identifies the particular client that hosts the group, and also indicates the nature of participation of the user. For instance, it indicates that the user is participating as a guest.

Figure 4J:
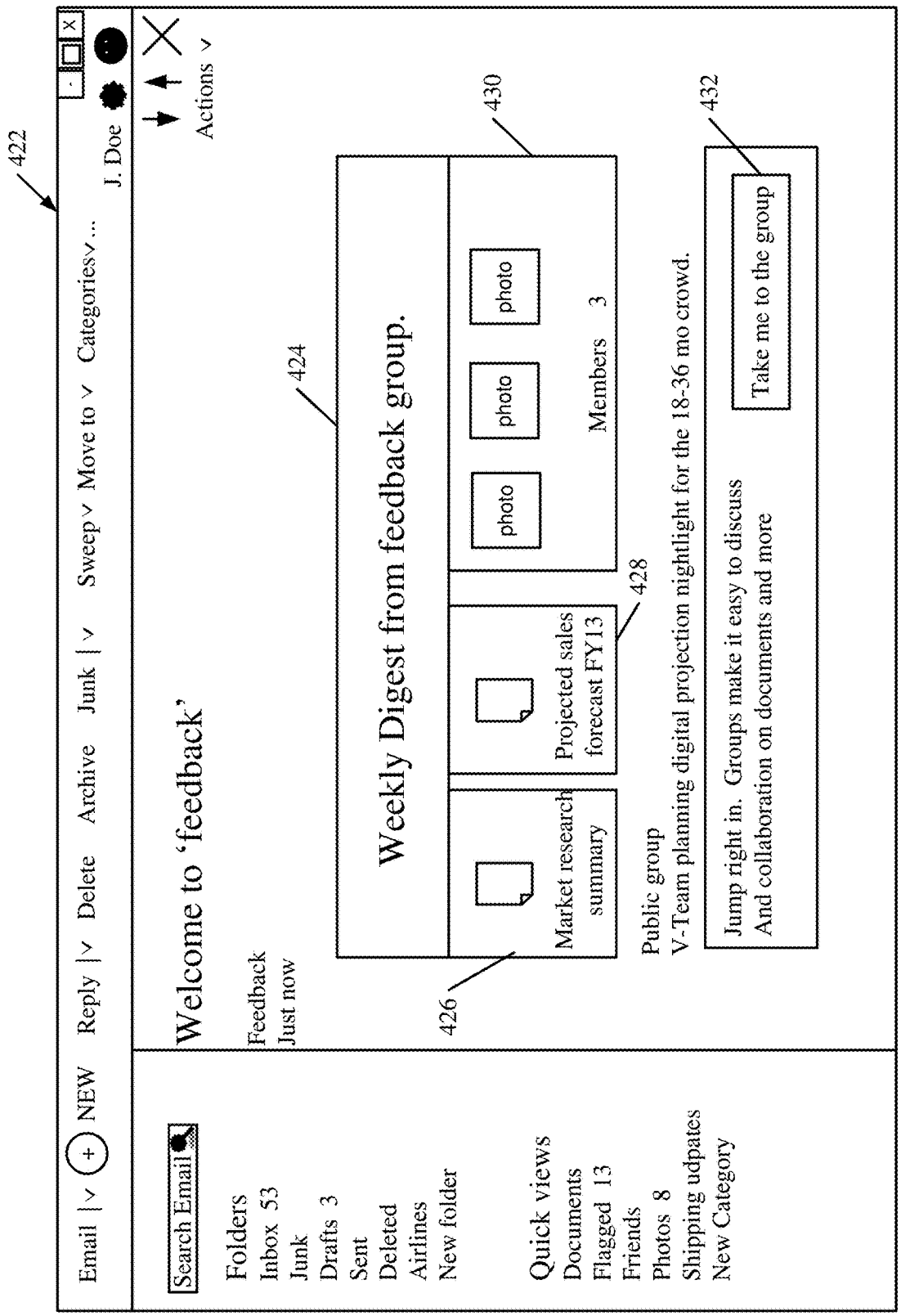

FIG. 4J shows another user interface display 422. User interface display 422 shows one example of a digest that is displayed when the user has subscribed to the digest resource for a given group. In the example shown in FIG. 4J, the digest display includes a title section 424 that identifies the digest as a "weekly" digest, and it also identifies the group for which the digest was generated. The digest can include links to documents, such as a word processing document 426 or a spreadsheet document 428 that were created during the previous week. It can identify members generally at 430 that joined during the previous week, and it can include links to the profiles for those members. It can also illustratively include a user input mechanism 432 that allows the user to navigate directly to the group for which the digest was generated. It can of course include other or different links or information or user input mechanisms, etc., and those shown in FIG. 4J are shown for the sake of example only.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
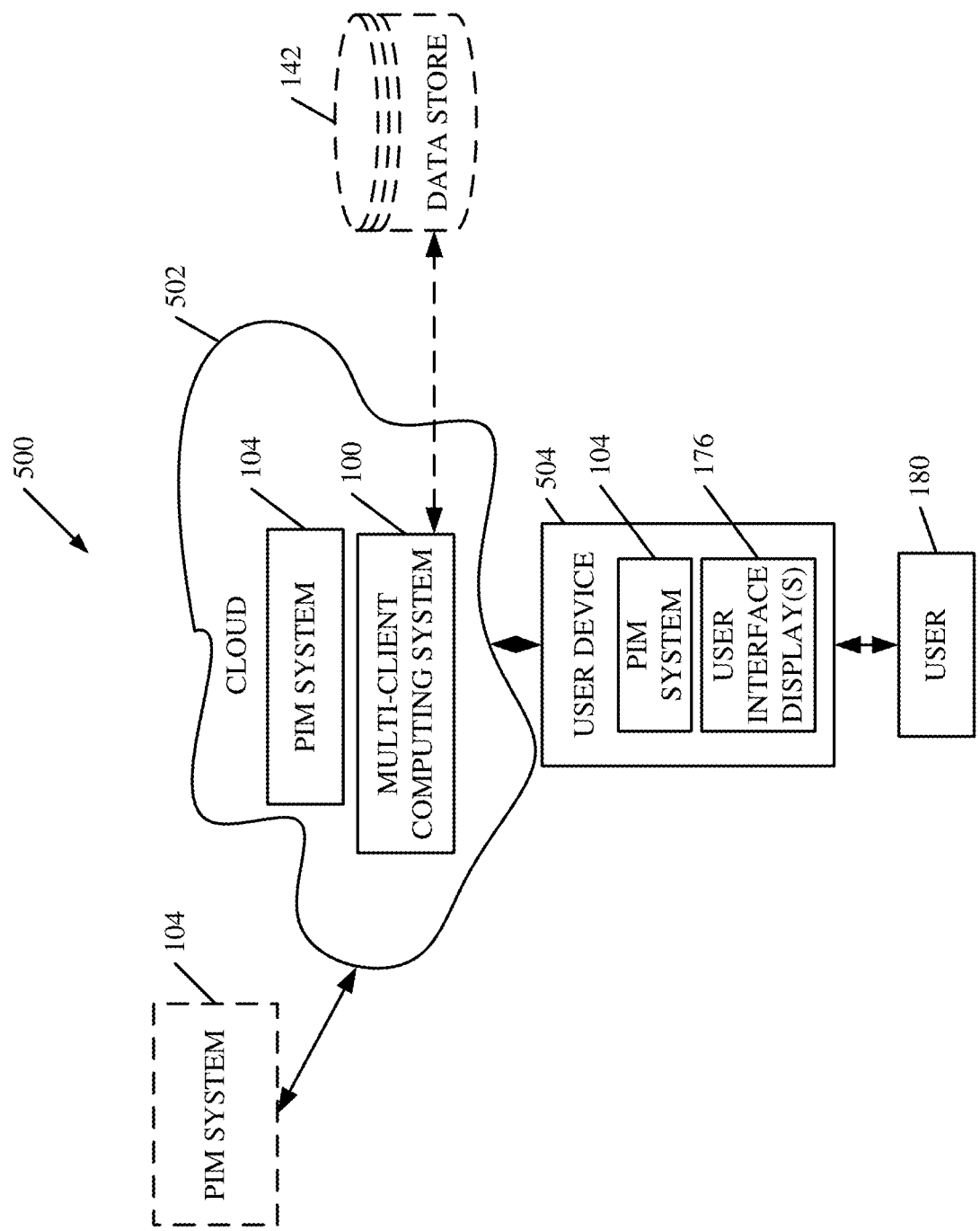
FIG. 5 shows one embodiment of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that architecture 100 can be located in cloud 502 (which can be public, private, or a combination where portions are public while others are private). Therefore, user 180 uses a user device 504 to access those systems through cloud 502.

FIG. 5 also depicts another embodiment of a cloud architecture. FIG. 5 shows that it is also contemplated that some elements of architecture 100 can be disposed in cloud 502 while others are not. By way of example, data store 142 can be disposed outside of cloud 502, and accessed through cloud 502. In another embodiment, PIM system 104 can be outside of cloud 502, within user device 504, or elsewhere. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
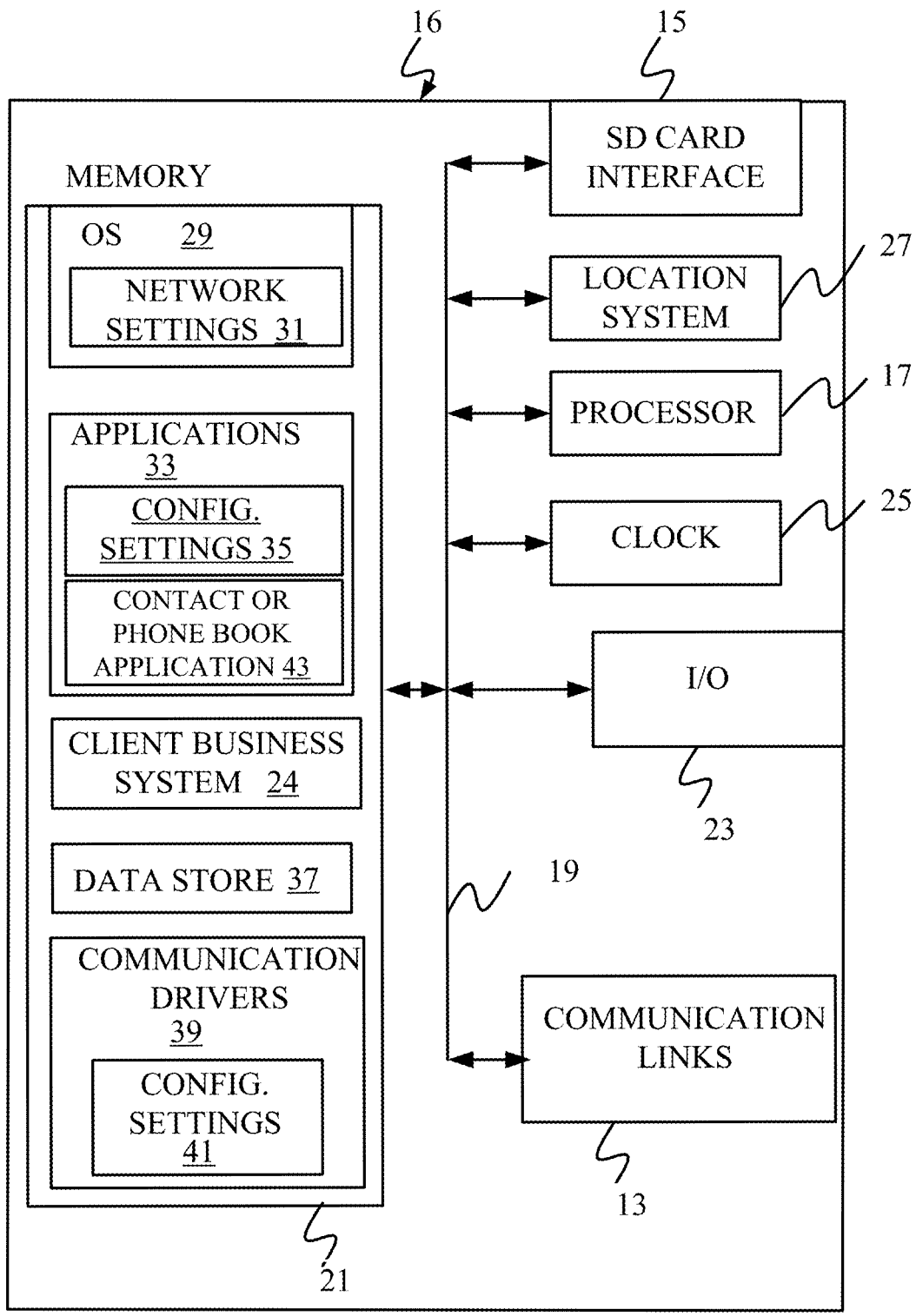
FIGS. 6-10 show various embodiments of mobile devices.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 140 or 172 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
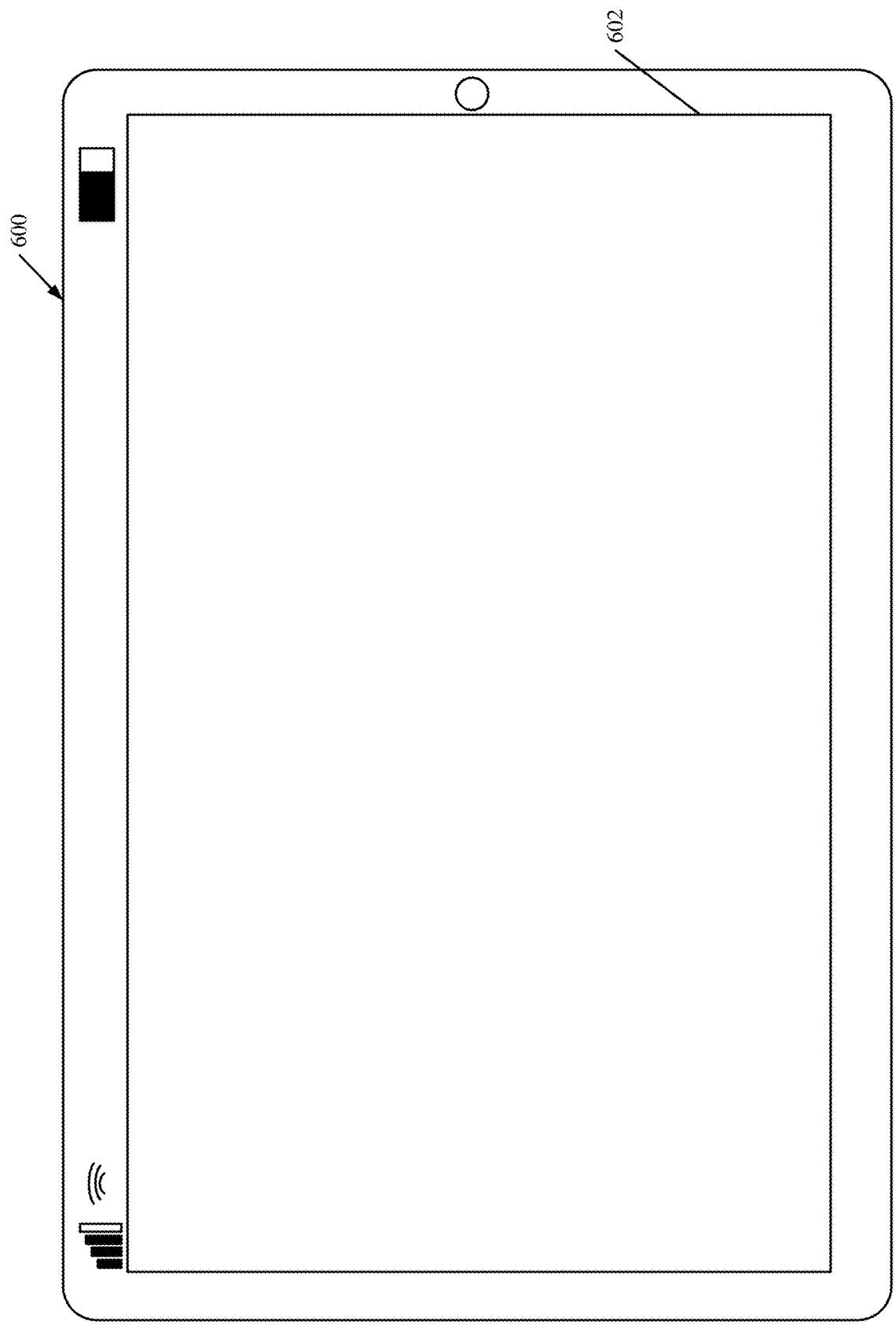

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
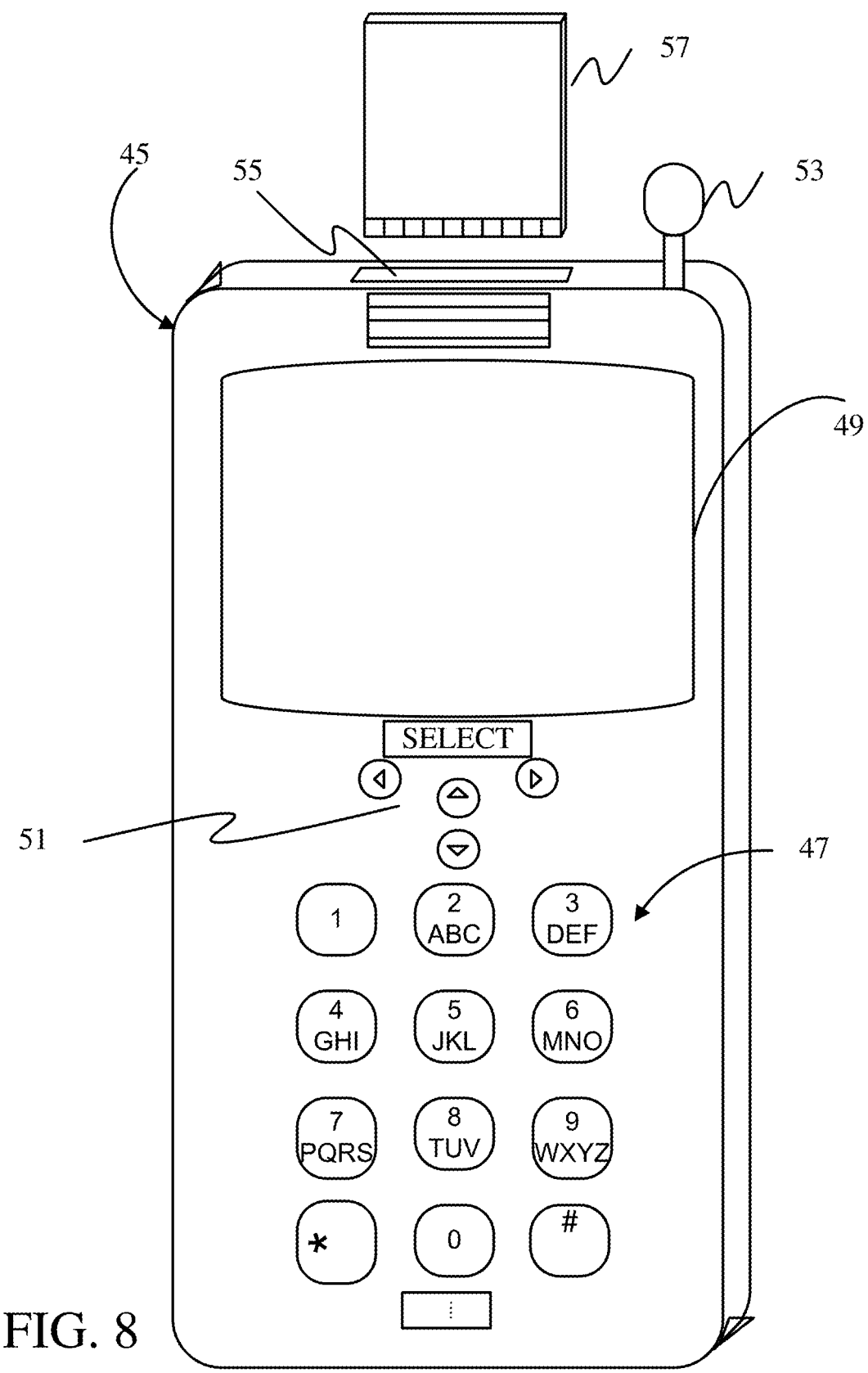
Figure 9:
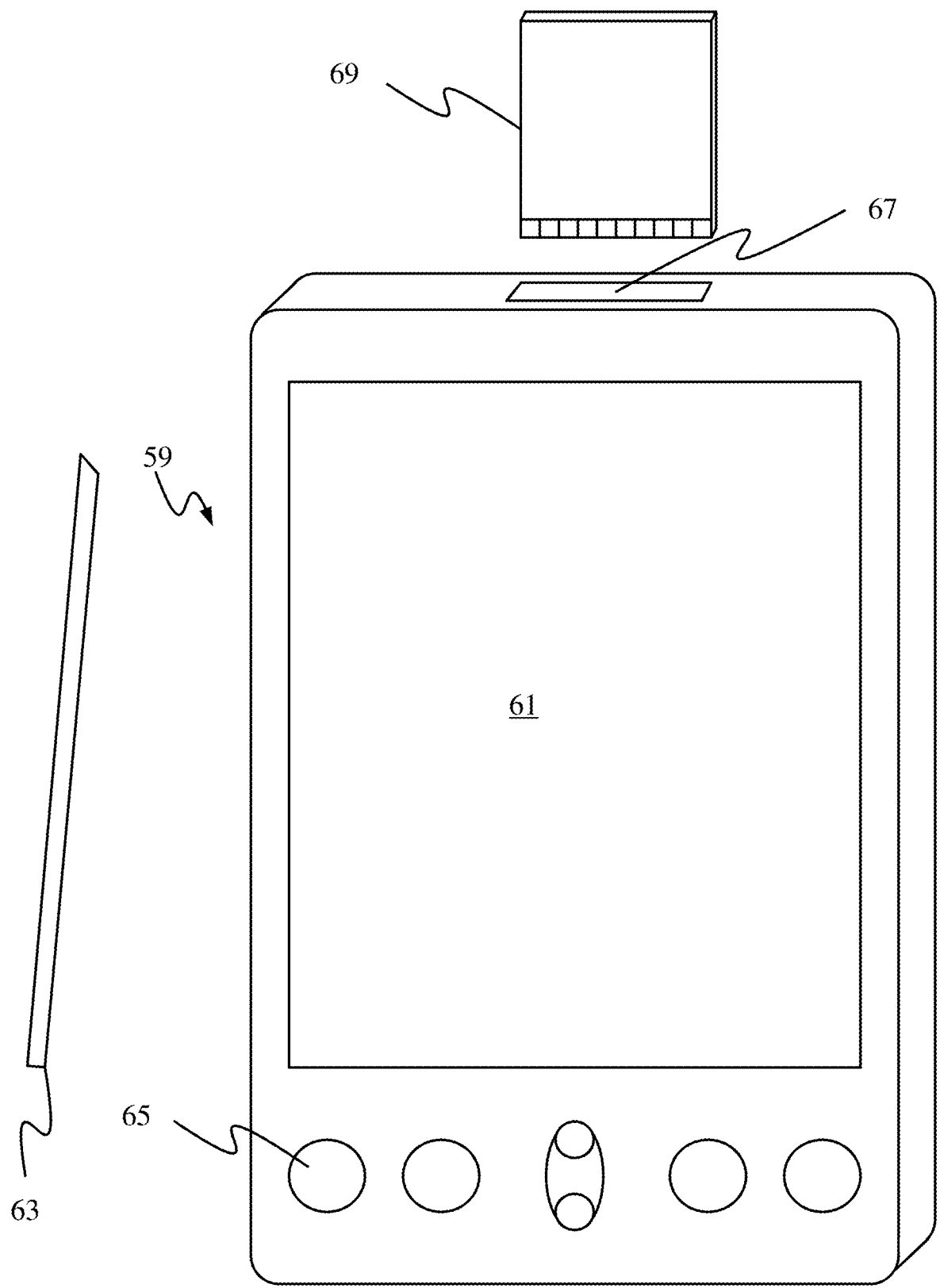

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
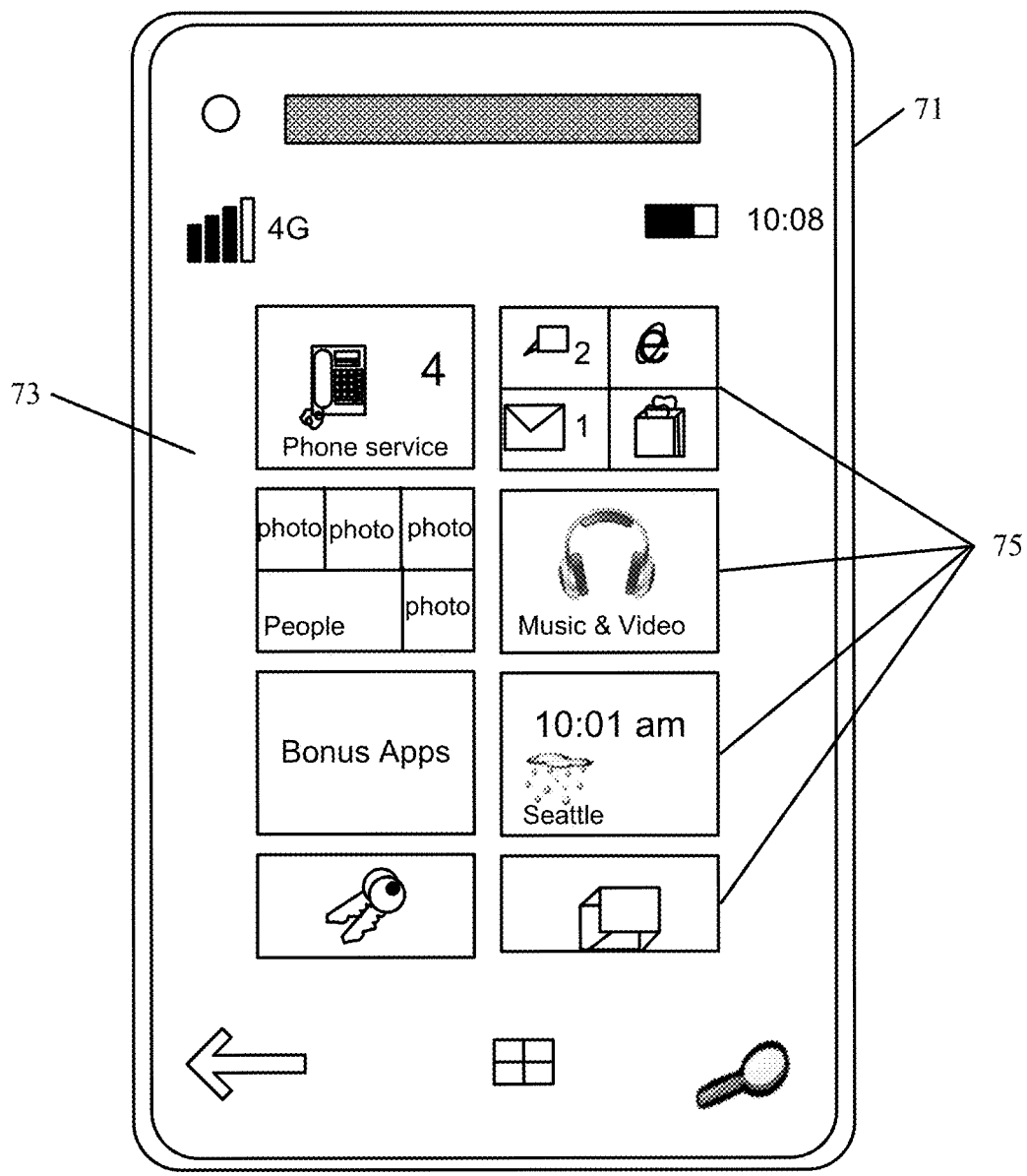

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
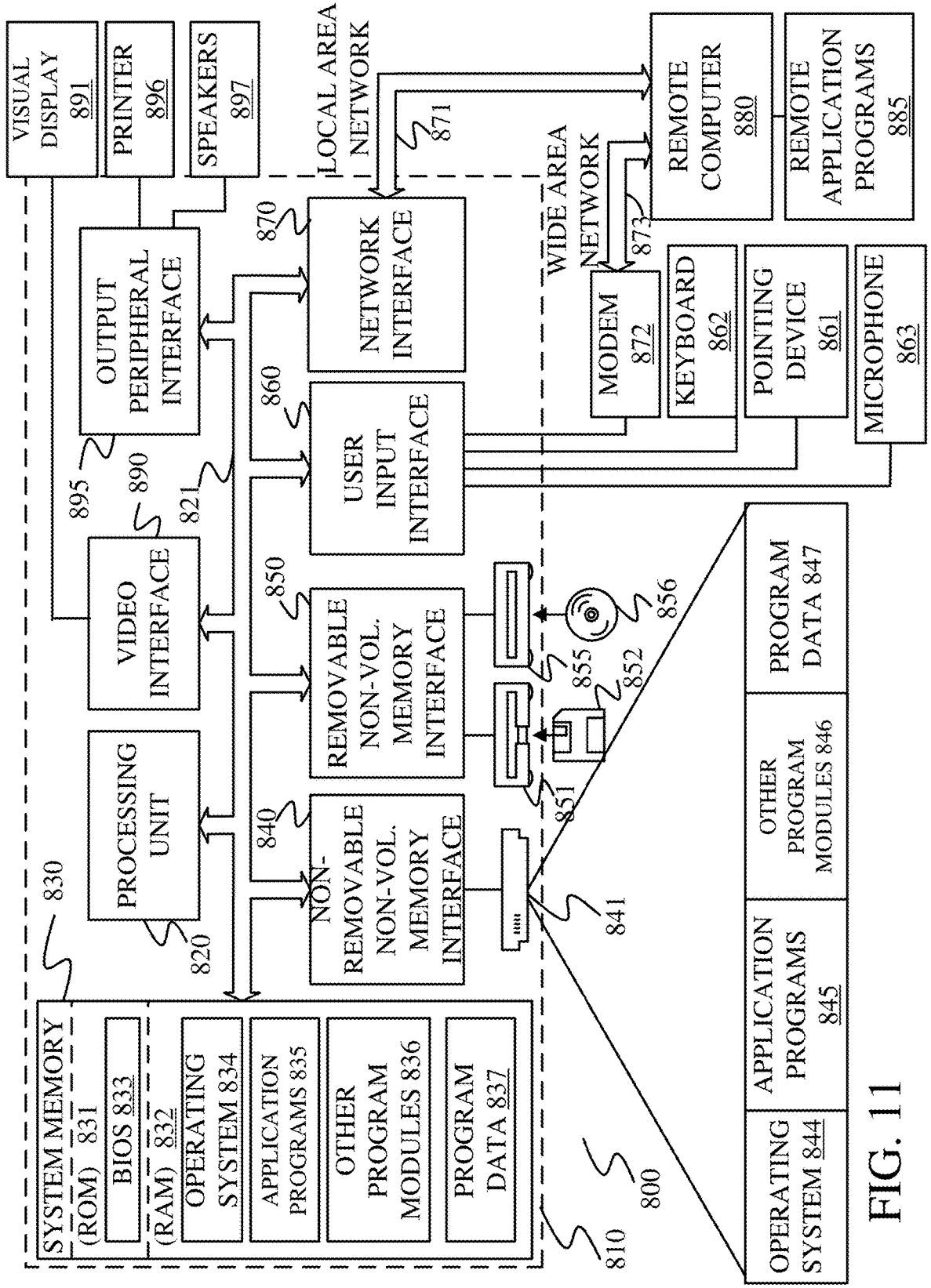
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processors 140 or 172), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method comprising:
   accessing group subscription data indicating that a user is subscribed to receive resource updates from a plurality of different groups hosted by a plurality of different tenant systems in a multi-tenant computing system, wherein the plurality of different groups includes at least:

a first group that is hosted by a first one of the tenant systems, and includes one or more resources accessible h members of the first group through an authentication mechanism of the first tenant system; and a second group that is hosted by a second one of the tenant systems, and includes one or more resources accessible by members of the second group through an authentication mechanism of the second tenant system;

based on the group subscription data, obtaining a first resource update associated with the first group hosted by the first tenant system and identifying a second resource update associated with the second group hosted by the second tenant system;

generating an aggregated set of resource updates that includes at least the first and second resource updates;

generating an integrated view that
renders the aggregated set of resource updates with cross-tenant group identifiers that identify, for each resource update in the aggregated set of updates, which tenant system hosts the group from which the resource update is obtained, and
includes an action user input mechanism corresponding to at least one of the resource updates and representing a computing action in the group corresponding to the at least one resource update; and based on an indication of user actuation of the action user input mechanism, generating a machine instruction that instructs the corresponding tenant system, that hosts the corresponding group, to perform the computing action.

2. The method of claim 1, and further comprising:
receiving an input indicative of the user accessing a user system associated with the user, the user system being configured to access the plurality of tenant systems over a computer network.

3. The method of claim 2, wherein each of the first and second tenant systems comprises:
a computing system instance that is accessible by one or more users associated with the tenant system; and
a plurality of groups, each group including group membership data that identifies users that are members of the group, and one or more resources that are updated by the members of the group.

4. The method of claim 2, wherein the integrated view displays the resource updates in a personal mail box in the user system, integrated with personal mail messages in the user system.

5. The method of claim 1, wherein generating the integrated view comprises:
receiving selection of a particular update generated by a particular one of the groups; and
displaying the particular update with a same level of content displayed if the user logged into the tenant system that hosts the particular group.

6. The method of claim 5, wherein displaying the particular update comprises:
displaying the particular update with a same set of action user input mechanisms displayed if the user logged into the tenant system that hosts the particular group.

7. A method performed by a computing system, the method comprising:
receiving a resource selection input that is associated with a user and is indicative of user selection of:
a first resource in a first group hosted by a first tenant system, the first resource being accessible by members of the first group through an authentication mechanism of the first tenant system, and a second resource in a second group hosted by a second tenant system, the second resource being accessible by members of the second group through an authentication mechanism of the second tenant system; and generating group subscription data that indicates that the user is subscribed to receive resource updates to the first and second resources in the first and second groups, respectively;

based on the group subscription data, generating an aggregated set of resource updates that includes resource updates associated with the first and second resources in the first and second groups; and generating an integrated view that
renders the aggregated set of resource updates with cross-tenant identifiers that identify, for each resource update in the aggregated set of updates, which tenant system hosts the group from which the resource update is obtained, and
includes an action user input mechanism corresponding to at least one of the resource updates and representing a computing action in the group corresponding to the at least one resource update; and based on an indication of user actuation of the action user input mechanism, generating a machine instruction that instructs the corresponding tenant system, that hosts the corresponding group, to perform the computing action.

8. The method of claim 7, wherein the second resource comprises a different type of computing resource than the first resource.

9. The method of claim 7, wherein receiving a resource selection user input comprises:
receiving a first notification setting associated with the first resource in the first group;
receiving a second notification setting associated with the second resource in the second group, the second notification setting identifying a different type of notification than the first notification setting; and
generating user notifications for resource updates to the first and second resources based on the first and second notification settings.

10. The method of claim 9, further comprising:
sending a first user notification, to the user, for a resource update to the first resource using a first type of communication channel; and
sending a second user notification, to the user, for a resource update to the second resource using a second type of communication channel.

11. A computing system comprising:
at least one processor; and
memory storing instructions executable by the at least one processor, wherein the instructions, when executed, configure the computing system to:
access group subscription data indicating that a user is subscribed to receive resource updates from a plurality of different groups hosted by a plurality of tenant systems, wherein the plurality of different groups includes at least:
a first group that is hosted by a first one of the tenant systems, and includes one or more resources accessible by members of the first group through an authentication mechanism of the first tenant system; and
a second group that is hosted by a second one of the tenant systems, and includes one or more resources accessible by members of the second group through an authentication mechanism of the second tenant system;

based on the group subscription data, generate an aggregated set of resource updates that includes a first resource update associated with the first group hosted by the first tenant system and identifying a second resource update associated with the second group hosted by the second tenant system; and generate an integrated view that
renders the aggregated set of resource updates with cross-tenant group identifiers that identify, for each resource update in the aggregated set of updates, which tenant system hosts the group from which the resource update is obtained, and
includes an action user input mechanism corresponding to at least one of the resource updates and representing a computing action in the group corresponding to the at least one resource update; and
based on an indication of user actuation of the action user input mechanism, generate a machine instruction that instructs the corresponding tenant system, that hosts the corresponding group, to perform the computing action.

12. The computing system of claim 11, wherein the corresponding tenant system comprises a tenant hosted b a multi-tenant computing system.

13. The computing system of claim 11, wherein the instructions configure the computing system to:
receive an input indicative of the user accessing a user system associated with the user, the user system being configured to access the plurality of tenant systems over a computer network.

14. The computing system at claim 13, wherein each of the first and second tenant systems comprises:
a computing system instance that is accessible by one or more users associated with the tenant system; and
a plurality of groups, each group including group membership data that identifies users that are members of the group, and one or more resources that are updated by the members of the group.

15. The computing system of claim 13, wherein the instructions configure the computing system to:
receive a resource selection input that is associated with the user and is indicative of user selection of:
a first resource in a first group, and
a second resource in a second group; and
generate group subscription data that is associated with the user and indicates that the user is subscribed to receive resource updates to the first and second resources in the first and second groups, respectively.

16. The computing system of claim 15, wherein the second resource comprises a different type of computing resource than the first resource.

17. The computing system of claim 15, wherein the instructions configure the computing system to:
receive a first notification setting associated with the first resource in the first group;
receive a second notification setting associated with the second resource in the second group, the second notification setting identifying a different type of notification than the first notification setting; and
generate user notifications for resource updates to the first and second resources based on the first and second notification settings.

18. The computing system of claim 13, wherein the integrated view displays the resource updates in a personal mail box in the user system, integrated with personal mail messages in the user system.

* * * * *